US012505246B2

(12) United States Patent
Srinivasan et al.

(10) Patent No.: US 12,505,246 B2
(45) Date of Patent: Dec. 23, 2025

(54) ATTRIBUTE-LEVEL ACCESS CONTROL FOR FEDERATED QUERIES

(71) Applicant: Optum, Inc., Minnetonka, MN (US)

(72) Inventors: Srivatsan Srinivasan, Lake Stevens, WA (US); Priyadarshni Natarajan, Redmond, WA (US); Lars F. Joreteg, Eureka, CA (US); John Jose Anto Gerard Arokiasamy, Chaska, MN (US)

(73) Assignee: Optum, Inc., Minnetonka, MN (US)

( * ) Notice: Subject to any disclaimer, the term of this patent is extended or adjusted under 35 U.S.C. 154(b) by 122 days.

(21) Appl. No.: 18/365,494

(22) Filed: Aug. 4, 2023

(65) Prior Publication Data
US 2025/0045445 A1    Feb. 6, 2025

(51) Int. Cl.
*G06F 21/62* (2013.01)
(52) U.S. Cl.
CPC ...... *G06F 21/6227* (2013.01); *G06F 21/6254* (2013.01); *G06F 2221/2113* (2013.01); *G06F 2221/2141* (2013.01)
(58) Field of Classification Search
CPC ....... G06F 21/62; G06F 21/6218–6281; G06F 2221/2113; G06F 2221/2141; H04L 63/08; H04L 63/10–108
See application file for complete search history.

(56) References Cited

U.S. PATENT DOCUMENTS

| 1,372,871 A | 3/1921 | Droll |
| 6,901,403 B1 | 5/2005 | Bata et al. |
| 6,950,823 B2 | 9/2005 | Amiri et al. |

(Continued)

FOREIGN PATENT DOCUMENTS

| WO | 2011/155743 A2 | 12/2011 |
| WO | 2012/007745 A2 | 1/2012 |

(Continued)

OTHER PUBLICATIONS

Anaissi, et al., "A Personalized Federated Learning Algorithm: An Application in Anomaly Detection", (10 pages), Nov. 5, 2021, arXiv:2111.02627v1.

(Continued)

*Primary Examiner* — Kevin Bechtel
(74) *Attorney, Agent, or Firm* — Alston & Bird LLP

(57) ABSTRACT

Various embodiments of the present disclosure provide access control for data provided by a federated query system based on attributes of a federated query. The techniques include determining a user identifier associated with a federated query, determining a set of access controls for a plurality of third-party data sources based on the user identifier, and generating an execution plan for resolving the federated query via one or more executable tasks with respect to the plurality of third-party data sources. The techniques also include generating, using a first portion of the execution plan, a result set that comprises information aggregated from the plurality of third-party data sources in accordance with the federated query. The techniques also include generating, using a second portion of the execution plan, a user result set that masks a portion of the information for the result set in accordance with the set of access controls.

20 Claims, 8 Drawing Sheets

(56) References Cited

U.S. PATENT DOCUMENTS

| | | |
|---|---|---|
| 7,403,956 B2 | 7/2008 | Vaschillo et al. |
| 7,812,826 B2 | 10/2010 | Ording et al. |
| 7,831,594 B2 | 11/2010 | Mehta et al. |
| 7,924,271 B2 | 4/2011 | Christie et al. |
| 7,945,581 B2 | 5/2011 | Bayliss et al. |
| 8,223,134 B1 | 7/2012 | Forstall et al. |
| 8,341,104 B2 | 12/2012 | Manickam et al. |
| 8,515,975 B1 | 8/2013 | Federici |
| 8,539,345 B2 | 9/2013 | Appleyard et al. |
| 8,572,031 B2 | 10/2013 | Merriman et al. |
| 8,762,406 B2 | 6/2014 | Ho et al. |
| 8,930,410 B2 | 1/2015 | Alton et al. |
| 9,116,812 B2 | 8/2015 | Joshi et al. |
| 9,246,776 B2 | 1/2016 | Ellsworth et al. |
| 9,390,112 B1 | 7/2016 | Daly et al. |
| 9,489,440 B2 | 11/2016 | Stritzel et al. |
| 9,558,230 B1 | 1/2017 | Hollifield et al. |
| 9,600,504 B2 | 3/2017 | Marrelli et al. |
| 9,646,226 B2 | 5/2017 | Wang et al. |
| 10,185,728 B2 | 1/2019 | Nath et al. |
| 10,229,161 B2 | 3/2019 | Kakarla et al. |
| 10,296,524 B1 | 5/2019 | Tung et al. |
| 10,409,802 B2 | 9/2019 | Spitz et al. |
| 10,698,954 B2 | 6/2020 | Piechowicz et al. |
| 10,719,301 B1 | 7/2020 | Dasgupta et al. |
| 10,762,539 B2 | 9/2020 | Murugesan et al. |
| 10,795,598 B1 | 10/2020 | Vohra |
| 10,817,483 B1 | 10/2020 | Samdani et al. |
| 10,867,063 B1 | 12/2020 | Avanes et al. |
| 10,872,236 B1 | 12/2020 | Elor et al. |
| 10,896,176 B1 | 1/2021 | Creedon et al. |
| 10,908,926 B2 | 2/2021 | Coven et al. |
| 11,074,107 B1 | 7/2021 | Nandakumar |
| 11,093,500 B2 | 8/2021 | Gladwin et al. |
| 11,094,029 B2 | 8/2021 | Kalamkar et al. |
| 11,100,420 B2 | 8/2021 | Dirac et al. |
| 11,113,784 B2 | 9/2021 | Ray et al. |
| 11,119,980 B2 | 9/2021 | Szczepanik et al. |
| 11,126,632 B2 | 9/2021 | Pal et al. |
| 11,157,470 B2 | 10/2021 | Schuetz |
| 11,204,851 B1 | 12/2021 | Iyengar et al. |
| 11,281,673 B2 | 3/2022 | Nanda et al. |
| 11,301,467 B2 | 4/2022 | Slezak et al. |
| 11,321,330 B1 | 5/2022 | Pandis et al. |
| 11,475,350 B2 | 10/2022 | Mcmahan et al. |
| 11,550,812 B2 | 1/2023 | Liu et al. |
| 11,636,108 B1 | 4/2023 | Xu et al. |
| 2004/0153435 A1 | 8/2004 | Gudbjartsson et al. |
| 2006/0218117 A1* | 9/2006 | Gupta ............... G06F 16/2471 |
| 2006/0218149 A1 | 9/2006 | Patrick |
| 2006/0259977 A1 | 11/2006 | Patrick |
| 2007/0262964 A1 | 11/2007 | Zotov et al. |
| 2008/0104089 A1 | 5/2008 | Pragada et al. |
| 2009/0309847 A1 | 12/2009 | Russell et al. |
| 2010/0031202 A1 | 2/2010 | Morris et al. |
| 2010/0315438 A1 | 12/2010 | Horodezky et al. |
| 2011/0013049 A1 | 1/2011 | Thörn |
| 2011/0074710 A1 | 3/2011 | Weeldreyer et al. |
| 2011/0074824 A1 | 3/2011 | Srinivasan et al. |
| 2012/0084711 A1 | 4/2012 | Duarte et al. |
| 2012/0089950 A1 | 4/2012 | Tseng |
| 2012/0147050 A1 | 6/2012 | Dai et al. |
| 2012/0159402 A1 | 6/2012 | Nurmi et al. |
| 2012/0210066 A1 | 8/2012 | Joshi et al. |
| 2012/0290592 A1* | 11/2012 | Ishii ..................... G06F 16/256 |
| | | 707/754 |
| 2012/0317096 A1 | 12/2012 | Kaufmann et al. |
| 2013/0086039 A1 | 4/2013 | Salch et al. |
| 2013/0132360 A1 | 5/2013 | Kuznetsov et al. |
| 2013/0159288 A1 | 6/2013 | Nikankin |
| 2015/0169685 A1 | 6/2015 | Elias et al. |
| 2015/0193697 A1 | 7/2015 | Vasseur et al. |
| 2016/0147888 A1 | 5/2016 | Nguyen et al. |
| 2017/0013046 A1 | 1/2017 | Flynn |
| 2017/0220605 A1 | 8/2017 | Nivala et al. |
| 2017/0269921 A1 | 9/2017 | Martin Vicente et al. |
| 2017/0329466 A1 | 11/2017 | Krenkler et al. |
| 2018/0293276 A1 | 10/2018 | Bae et al. |
| 2018/0375720 A1 | 12/2018 | Yang et al. |
| 2019/0050459 A1 | 2/2019 | Griffith et al. |
| 2019/0065569 A1 | 2/2019 | Boutros et al. |
| 2019/0146978 A1 | 5/2019 | Beedgen et al. |
| 2019/0196890 A1 | 6/2019 | Bucchi et al. |
| 2019/0311372 A1 | 10/2019 | Lindner |
| 2019/0369969 A1 | 12/2019 | Donohoe et al. |
| 2019/0392296 A1 | 12/2019 | Brady et al. |
| 2020/0034742 A1 | 1/2020 | Dirac et al. |
| 2020/0050612 A1 | 2/2020 | Bhattacharjee et al. |
| 2020/0082010 A1 | 3/2020 | Bodziony et al. |
| 2020/0117434 A1 | 4/2020 | Biskup et al. |
| 2020/0202171 A1 | 6/2020 | Hughes et al. |
| 2020/0226012 A1 | 7/2020 | Pitre et al. |
| 2020/0250525 A1 | 8/2020 | Kumar Addepalli et al. |
| 2020/0319877 A1 | 10/2020 | Glazer et al. |
| 2020/0320379 A1 | 10/2020 | Watson et al. |
| 2020/0349161 A1 | 11/2020 | Siddiqui et al. |
| 2020/0401891 A1 | 12/2020 | Xu et al. |
| 2021/0019665 A1 | 1/2021 | Gur et al. |
| 2021/0081837 A1 | 3/2021 | Polleri et al. |
| 2021/0097343 A1 | 4/2021 | Goodsitt et al. |
| 2021/0174164 A1 | 6/2021 | Hsieh et al. |
| 2021/0286657 A1 | 9/2021 | Mathur et al. |
| 2021/0294577 A1 | 9/2021 | Dunn et al. |
| 2021/0304362 A1 | 9/2021 | Palmaro et al. |
| 2021/0334651 A1 | 10/2021 | Leng et al. |
| 2021/0390455 A1 | 12/2021 | Schierz et al. |
| 2022/0067181 A1 | 3/2022 | Carley |
| 2022/0078264 A1 | 3/2022 | Mathur |
| 2022/0086393 A1 | 3/2022 | Peters et al. |
| 2022/0091837 A1 | 3/2022 | Chai et al. |
| 2022/0108177 A1 | 4/2022 | Samek et al. |
| 2022/0114451 A1 | 4/2022 | Muñoz et al. |
| 2022/0129581 A1 | 4/2022 | Jones et al. |
| 2022/0138561 A1 | 5/2022 | Prendki |
| 2022/0172040 A1 | 6/2022 | Kazi et al. |
| 2022/0245176 A1 | 8/2022 | Weisman |
| 2022/0269691 A1 | 8/2022 | Liu et al. |
| 2022/0269706 A1 | 8/2022 | Balasubramanian et al. |
| 2022/0300850 A1 | 9/2022 | Mendez et al. |
| 2022/0374914 A1 | 11/2022 | Morrill et al. |
| 2022/0407861 A1 | 12/2022 | Beecham et al. |
| 2023/0152994 A1 | 5/2023 | Jiang et al. |
| 2023/0315731 A1 | 10/2023 | Xu et al. |
| 2023/0325389 A1 | 10/2023 | Fan et al. |
| 2023/0418468 A1 | 12/2023 | Shah et al. |
| 2024/0078333 A1* | 3/2024 | Lim ..................... G06F 21/6227 |
| 2024/0134842 A1 | 4/2024 | Kim et al. |
| 2024/0320231 A1 | 9/2024 | Bhattacharjee et al. |

FOREIGN PATENT DOCUMENTS

| | | |
|---|---|---|
| WO | 2021/144803 A1 | 7/2021 |
| WO | 2022/185324 A1 | 9/2022 |
| WO | 2022/269526 A1 | 12/2022 |
| WO | 2023/248204 A1 | 12/2023 |

OTHER PUBLICATIONS

Cai, et al., "The Challenges of Data Quality and Data Quality Assessment in the Big Data Era", Data Science Journal, vol. 14, pp. 1-10, May 15, 2015, DOI: http://dx.doi.org/10.5334/dsj-2015-002.

Cohen, Yoav, "Introducing Universal Masking", satori, (7 pages), Nov. 11, 2020, Retrieved on https://blog.satoricyber.com/introducing-universal-masking/.

Costa, et al., "A Survey on Data-Driven Performance Tuning for Big Data Analytics Platforms", Big Data Research, vol. 25, (17 pages), Jan. 27, 2021.

Debattista, et al., "A Methodology and Framework for Linked Data Quality Assessment", ACM Journal of Data and Information Quality, vol. 4, (29 pages), Jan. 2016, DOI: http://dx.doi.org/10.1145/0000000.0000000.

(56) References Cited

OTHER PUBLICATIONS

Devarajan, et al., "Acceleration via Multi-Tiered Data Buffering and Prefetching", Journal of Computer Science and Technology, vol. 35, pp. 92-120, Jan. 2020, DOI: 10.1007/s11390-020-9781-1.
Einziger, et al., "A Highly Efficient Cache Admission Policy", (24 pages), Dec. 3, 2015, arXiv:1512.00727v2.
Fuhl, et al., "Explainable Online Validation of Machine Learning Models for Practical Applications", (9 pages), Jan. 17, 2021, arXiv:2010.00821v3.
Hirano, et al., "RanSAP: An Open Dataset of Ransomware Storage Access Patterns for Training Machine Learning Models", Forensic Science International: Digital Investigation, vol. 40, (22 pages), Dec. 16, 2021, https://www.sciencedirect.com/science/article/pii/S2666281721002390.
Immuta, "Immuta Architecture: Dive Deeper into the Platform", (9 pages), Jan. 3, 2023, Retrieved from https://www.immuta.com/product/architecture/.
Jain et al., "Efficient Execution of Quantized Deep Learning Models: A Compiler Approach", (12 pages), Jun. 18, 2020, arXiv:2006.10226v1.
Janardhanan, PS, "Project Repositories for Machine Learning with TensorFlow", ScienceDirect, vol. 171, pp. 188-196, (2020).
Jin, Lei, "Software-Oriented Distributed Shared Cache Management for Chip Multiprocessors", University of Pittsburgh, (133 pages), 2010, http://d-scholarship.pitt.edu/8834/1/Lei.Jin.08.15.2010.PhD.Thesis.pdf.
Kopp, Andreas, "Practical Federated Learning with Azure Machine Learning", Towards Data Science, (21 pages), Aug. 17, 2022, https://towardsdatascience.com/practical-federated-learning-with-azure-machine-learning-8807f9bd1a7e.
Masolo, Claudio, "Google's BigQuery Introduces col. Level Encryption Functions and Dynamic Masking of Information", InfoQ, (6 pages), Jul. 7, 2022, Retrieved from https://www.infoq.com/news/2022/07/google-bigquery-encryption/.
Pollok, et al., "Open Fabric for Deep Learning Models", IBM Research, (5 pages), 2018, Retrieved at https://openreview.net/pdf?id=SkgCTFpV2X.
Rivie' Res, et al., "Eclipse: A Platform for Integrating Development Tools", IBM Systems Journal, (14 pages), Jan. 2004, DOI: 10.1147/sj.432.0371.
Schwarz, et al., "Augmenting Web Pages and Search Results to Support Credibility Assessment", CHI 2011, (10 pages), May 7, 2011, https://juliaschwarz.net/assets/web-credibility/schwarz-chi11-web-credibility.
Snowflake, "Understanding Dynamic Data Masking", (1 page), Jan. 4, 2023, Retrieved from https://docs.snowflake.com/en/user-guide/security-column-ddm.html.
Vasilache, et al., "Tensor Comprehensions: Framework-Agnostic High-Performance Machine Learning Abstractions", (37 pages), Jun. 29, 2018, arXiv:1802.04730v3.
Witt, et al., "Predictive Performance Modeling for Distributed Computing Using Black-Box Monitoring and Machine Learning", Elsevier, (19 pages), May 30, 2018, arXiv:1805.11877v1.
Yates, et al., "Age-Optimal Constrained Cache Updating", IEEE International Symposium on Information Theory, (5 pages), 2017.
Non-Final Rejection Mailed on May 28, 2024 for U.S. Appl. No. 18/365,485, 9 page(s).
Non-Final Rejection Mailed on Sep. 28, 2024 for U.S. Appl. No. 18/462,846, 12 page(s).
Notice of Allowance and Fees Due (PTOL-85) Mailed on Oct. 2, 2024 for U.S. Appl. No. 18/242,954, 2 page(s).
Notice of Allowance and Fees Due (PTOL-85) Mailed on Sep. 10, 2024 for U.S. Appl. No. 18/242,954, 14 page(s).
Final Rejection Mailed on Oct. 31, 2024 for U.S. Appl. No. 18/365,485, 10 page(s).
Non-Final Rejection Mailed on Dec. 19, 2024 for U.S. Appl. No. 18/465,576, 7 page(s).
Notice of Allowance and Fees Due (PTOL-85) Mailed on Dec. 13, 2024 for U.S. Appl. No. 18/242,954, 2 page(s).
Notice of Allowance and Fees Due (PTOL-85) Mailed on Nov. 5, 2024 for U.S. Appl. No. 18/242,954, 2 page(s).
Advisory Action (PTOL-303) Mailed on Jan. 24, 2025 for U.S. Appl. No. 18/365,485, 2 page(s).
Notice of Allowance and Fees Due (PTOL-85) Mailed on Apr. 14, 2025 for U.S. Appl. No. 18/465,576, 8 page(s).
Notice of Allowance and Fees Due (PTOL-85) Mailed on Mar. 7, 2025 for U.S. Appl. No. 18/365,485, 8 page(s).
Final Rejection Mailed on Jun. 10, 2025 for U.S. Appl. No. 18/462,846, 11 page(s).
Notice of Allowance and Fees Due (PTOL-85) Mailed on Jun. 10, 2025 for U.S. Appl. No. 18/365,485, 5 page(s).

\* cited by examiner

ATTRIBUTE-LEVEL ACCESS CONTROL FOR FEDERATED QUERIES

BACKGROUND

Various embodiments of the present disclosure address technical challenges related to federated query processing techniques given limitations of existing federated query engines. Existing federated query engines generate result datasets by repeatedly pulling data segments from disparate remote data sources to resolve a complex federated query. As such, resolving federated queries using existing federated query engines is time consuming and resource intensive. Moreover, resolving federated queries using existing federated query engines may result in duplication of data and/or security vulnerabilities for the data sources. Various embodiments of the present disclosure make important contributions to various existing federated query engines by addressing these technical challenges.

BRIEF SUMMARY

Various embodiments of the present disclosure provide techniques for attribute-level access control to queried data provided by a federated query system. Using some of the techniques of the present disclosure, attributes of a federate query may be leveraged to retrieve and automatically mask queried data based on various aspects of the query, such as a user, a data source, and/or the like. In this way, some embodiments of the present disclosure improve upon traditional query systems by enabling secure and/or efficient processing of federated queries using dynamic access controls that account for characteristics of individual queries. The dynamic access controls improve flexibility, security, and redundancy relative to traditional federated query techniques and enable new query outputs that selectively mask data in an on-demand setting.

In some embodiments, a computer-implemented method includes receiving, by one or more processors, a federated query from a user device that references one or more data segments from a plurality of third-party data sources. In some embodiments, the computer-implemented method additionally or alternatively includes determining, by the one or more processors, a user identifier associated with the federated query. In some embodiments, the computer-implemented method additionally or alternatively includes determining, by the one or more processors, a set of access controls for the plurality of third-party data sources based on the user identifier. In some embodiments, the computer-implemented method additionally or alternatively includes generating, by the one or more processors, an execution plan for resolving the federated query via one or more executable tasks with respect to the plurality of third-party data sources. In some embodiments, the computer-implemented method additionally or alternatively includes generating, by the one or more processors and using a first portion of the execution plan, a result set that comprises information aggregated from the plurality of third-party data sources in accordance with the federated query. In some embodiments, the computer-implemented method additionally or alternatively includes generating, by the one or more processors and using a second portion of the execution plan, a user result set that masks a portion of the information for the result set in accordance with the set of access controls.

In some embodiments, a system includes memory and one or more processors communicatively coupled to the memory. In some embodiments, the one or more processors are configured to receive a federated query from a user device that references one or more data segments from a plurality of third-party data sources. In some embodiments, the one or more processors are additionally or alternatively configured to determine a user identifier associated with the federated query. In some embodiments, the one or more processors are additionally or alternatively configured to determine a set of access controls for the plurality of third-party data sources based on the user identifier. In some embodiments, the one or more processors are additionally or alternatively configured to generate an execution plan for resolving the federated query via one or more executable tasks with respect to the plurality of third-party data sources. In some embodiments, the one or more processors are additionally or alternatively configured to generate, using a first portion of the execution plan, a result set that comprises information aggregated from the plurality of third-party data sources in accordance with the federated query. In some embodiments, the one or more processors are additionally or alternatively configured to generate, using a second portion of the execution plan, a user result set that masks a portion of the information for the result set in accordance with the set of access controls.

In some embodiments, one or more non-transitory computer-readable storage media include instructions that, when executed by one or more processors, cause the one or more processors to receive a federated query from a user device that references one or more data segments from a plurality of third-party data sources. In some embodiments, the instructions, when executed by the one or more processors, additionally or alternatively cause the one or more processors to determine a user identifier associated with the federated query. In some embodiments, the instructions, when executed by the one or more processors, additionally or alternatively cause the one or more processors to determine a set of access controls for the plurality of third-party data sources based on the user identifier. In some embodiments, the instructions, when executed by the one or more processors, additionally or alternatively cause the one or more processors to generate an execution plan for resolving the federated query via one or more executable tasks with respect to the plurality of third-party data sources. In some embodiments, the instructions, when executed by the one or more processors, additionally or alternatively cause the one or more processors to generate, using a first portion of the execution plan, a result set that comprises information aggregated from the plurality of third-party data sources in accordance with the federated query. In some embodiments, the instructions, when executed by the one or more processors, additionally or alternatively cause the one or more processors to generate, using a second portion of the execution plan, a user result set that masks a portion of the information for the result set in accordance with the set of access controls.

DETAILED DESCRIPTION

Figure 1:
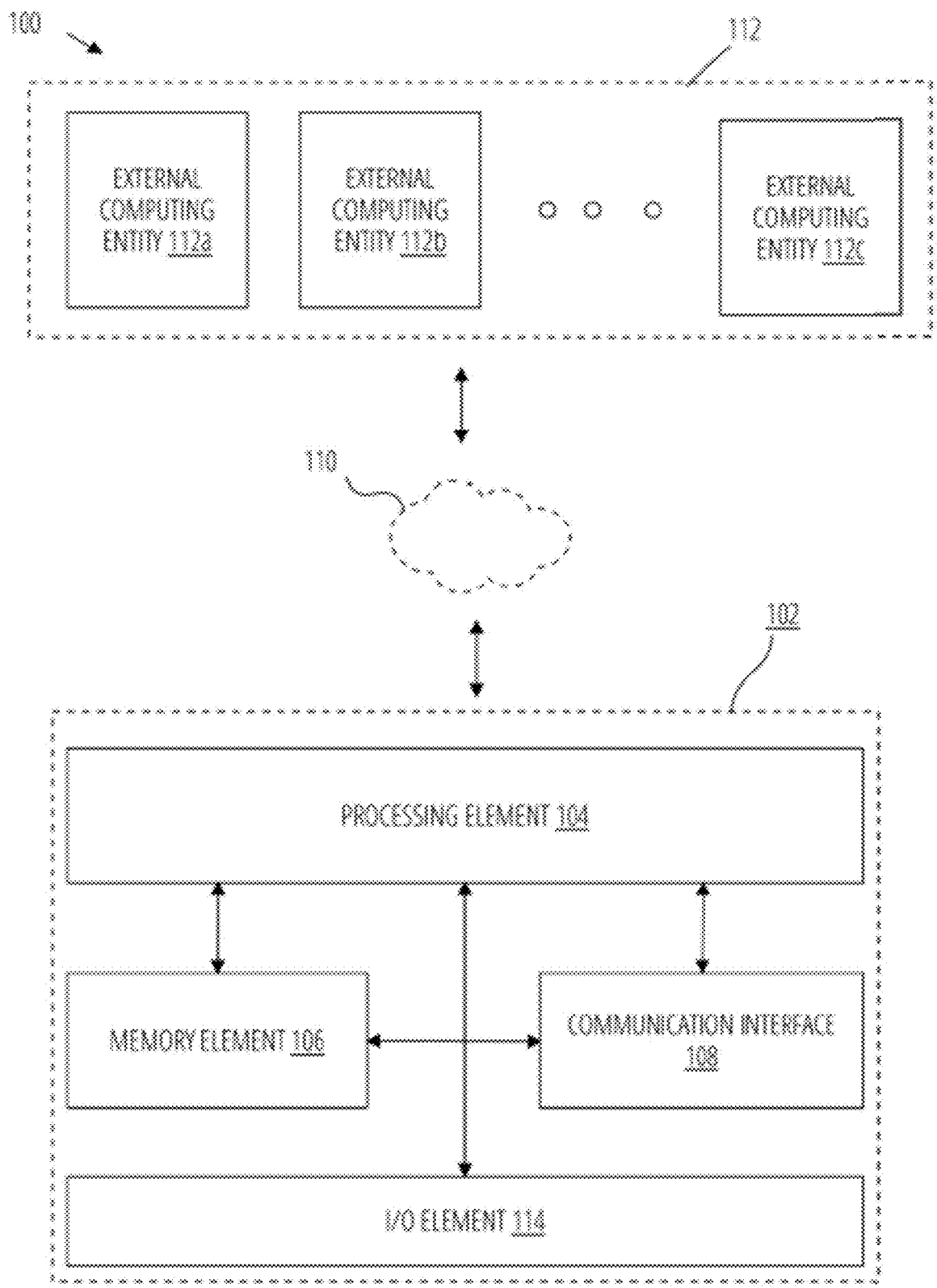
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., federated query processing techniques, optimization techniques, and/or the like) described herein.

The external computing entities 112a-c, for example, may include and/or be associated with one or more third-party data sources that may be configured to receive, store, manage, and/or facilitate a data catalog that is accessible to the predictive computing entity 102. By way of example, the predictive computing entity 102 may include a federated query system that is configured to access data segments from across one or more of the external computing entities 112a-c to resolve a complex, federated query. The external computing entities 112a-c, for example, may be associated with one or more data repositories, cloud platforms, compute nodes, and/or the like, that may be individually and/or collectively leveraged by the predictive computing entity 102 to resolve a federated query.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
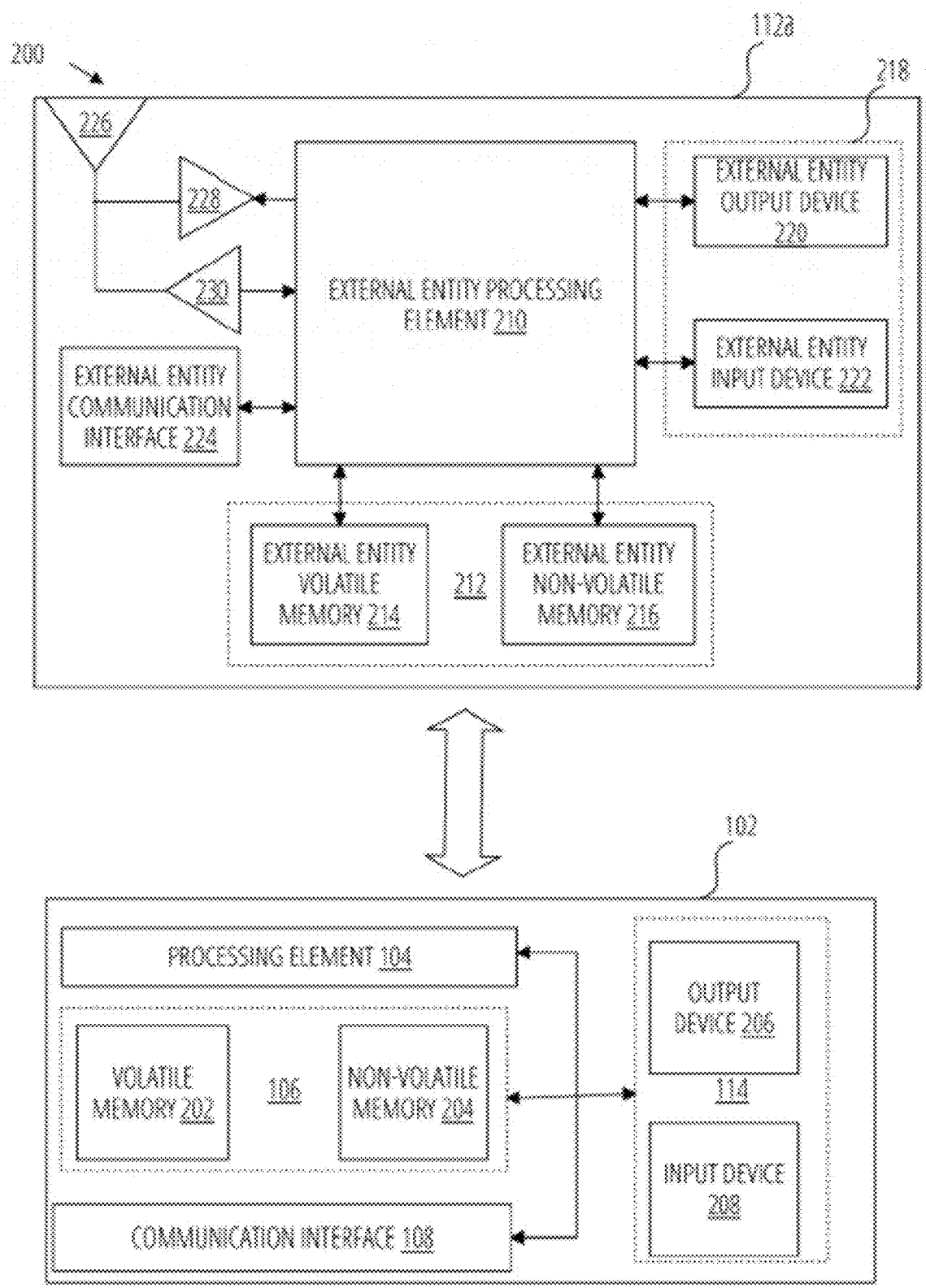
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual- Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time coordinated (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. EXAMPLES OF CERTAIN TERMS

In some embodiments, the term "first party" refers to a computing entity that is associated with a query-based action. The first party may include a computing system, platform, and/or device that is configured to initiate a query to one or more third-party data sources. For example, the first party may include first-party platform that is configured to leverage data from one or more disparate data sources to perform a computing action. The first-party platform may include a machine learning processing platform configured to facilitate the performance of one or machine learning models, a data processing platform configured to process, monitor, and/or aggregate large datasets, and/or the like. To improve computing efficiency and enable the aggregation of data across multiple disparate datasets, the first party may generate federated queries that reference datasets from multiple third parties and submit the federated queries to one intermediary query processing service configured to efficiently receive the queried data from the third parties and return the data to the first party. In some examples, the first party may have access to a query routine set (e.g., software development kit (SDK), etc.) that may be leveraged to wrap a query submission, acknowledgment, status polling, and result fetching application programming interfaces (APIs) to deliver a synchronous experience between the first party and the intermediary query processing service.

In some embodiments, the term "third-party data source" refers to a data storage entity configured to store, maintain, and/or monitor a data catalog. A third-party data source may include a heterogenous data store that is configured to store a data catalog using specific database technologies, such as Netezza, Teradata, and/or the like. A data store, for example, may include a data repository, such a database, and/or the like, for persistently storing and managing collections of structured and/or unstructured data (e.g., catalogs, etc.). A third-party data source may include an on-premises data store including one or more locally curated data catalogs. In addition, or alternatively, a third-party data source may include a remote data store including one or more cloud-based data lakes, such as Vulcan, Level2, and/or the like. In some examples, a third-party data source may be built on specific database technologies that may be incompatible with one or more other third-party data sources. Each of the third-party data sources may define a data catalog that, in some use cases, may include data segments that could be aggregated to perform a computing task.

In some embodiments, the term "federated query system" refers to a computing entity that is configured to perform an intermediary query processing service between a first party and a plurality of third-party data sources. The federated query system may define a single point of consumption for a first party. The federated query system may leverage a federated query engine to enable analytics by querying data where it is maintained (e.g., third-party data sources, etc.), rather than building complex extract, transform, and load (ETL) pipelines.

In some embodiments, the term "federated query" refers to a data entity that represents a query to a plurality of disparate, third-party data sources. The federated query may include a logical query statement that defines a plurality of query operations for receiving and processing data from multiple, different, third-party data sources.

In some embodiments, the term "data segment" refers to a portion of a third-party computing source. A data segment, for example, may include a segment of a data catalog corresponding to a third-party computing resource. In some examples, a data segment may include a data table stored by a third-party data source. In addition, or alternatively, the data segment may include a portion of the data table. By way of example, the data segment may include one or more index ranges, columns, rows, and/or combinations thereof of a third-party data source.

In some embodiments, the term "syntax tree" refers to a data entity that represents a parsed federated query. A syntax tree may include a tree data structure, such as directed acyclic graph (DAG), and/or the like, that includes a plurality of nodes and a plurality of edges connecting one or more of the plurality of nodes. Each of the plurality of nodes may correspond to a query operation for executing a federated query. The plurality of edges may define a sequence for executing each query operation represented by the plurality of nodes. By way of example, a federated query may be parsed to extract a plurality of interdependent query operations from a federated query. The plurality of interdependent query operations may include computing functions that may rely on an input from a previous computing function and/or provide an input to a subsequent computing function. As one example, a first, data scan, function may be performed to retrieve a data segment before a second, data join, function is performed using the data segment. The syntax tree may include a plurality of nodes and/or edges that define the query operations (e.g., the nodes) and the relationships (e.g., the edges) between each of the query operations of a federated query.

In some embodiments, the term "query operation" refers to a data entity that represents a portion of a federated query. A query operation may include data expression, such as a structured query language (SQL) expression, which may represent a primitive computing task for executing a portion of a federated query. A query operation, for example, may include a search/scan operation for receiving data from a third-party data source, a join operation for joining two data segments, and/or the like.

In some embodiments, the term "execution plan" refers to a data entity that represents an optimized plan for executing a federated query. The execution plan, for example, may include a plurality of executable tasks for generating a result set from a plurality of third-party data sources. The execution plan may be generated by a federated query engine in accordance with an execution strategy. The execution strategy may be designed to optimize the resolution of a federated query by breaking the federated query into a plurality of serializable units of work (e.g., compute tasks) that may be distributed among one or more compute nodes.

In some examples, a federated query is converted to a syntax tree to define each of the query operations of the federated query and the relationships therebetween. The syntax tree may be converted to a logical plan in the form of hierarchical nodes that denote the flow of input from various sub-nodes. The logical plan may be optimized using one or more optimization techniques, to generate an execution plan in accordance with an execution strategy. The optimization techniques may include any type of optimization function including, as examples, Predicate and Limit pushdown, Column-Pruning, Join re-ordering, Parallelization, and/or other cost-based optimization techniques. The portions (e.g., executable tasks) of the execution plan may be scheduled across distinct compute nodes to be performed in parallel to generate intermediate result sets. Each compute node, for example, may individually connect to one or more third-party data sources to execute at least one executable task of the execution plan. The execution of each executable task may generate intermediate results. The intermediate results from each executable task may be transferred to one compute node to generate a result set.

In some embodiments, the term "user identifier" refers to a data entity that identifies a user associated with a federated query. A user identifier may be included in a federated query. For example, a header portion, a data segment portion, metadata, or another portion of a federated query may include a user identifier. Alternatively, a user identifier may be determined using information included in a federated query and/or the user device associated with the federated query. For example, user device information, network address information, and/or other information included in a header portion, a data segment portion, metadata, or another portion of a federated query may be correlated to a user identifier.

In some embodiments, the term "executable task" refers to a data entity that represents a portion of an execution plan. An executable task may represent a unit of work for a compute node to perform a portion of a federated query. By way of example, an executable task may include one or more query operations, one or more data processing operations, one or more machine learning operations, one or more masking operations, and/or one or more other operations for performing a portion of the federated query.

In some embodiments, the term "data accessing task" refers to a data entity that represents a type of executable task. A data accessing task may represent a unit of work for a compute node to perform a portion of a federated query. A data accessing task, for example, may include one or more data access operations for accessing data from one or more data sources (e.g., third-party data sources, etc.) for performing a portion of the federated query. By way of example, data access operations may include one or more searching, scanning, and/or the like operations that, when executed, retrieve a data segment from a third-party data source.

In some embodiments, the term "data processing task" refers to a data entity that represents a type of executable task. A data processing task may represent a unit of work for a compute node to perform a portion of a federated query. A data processing task, for example, may include one or more data processing operations related to one or more data segments for performing a portion of the federated query. By way of example, the data processing operations may include one or more data aggregation, data augmentation, data sorting, data filtering, data analytics, and/or the like operations that, when executed, manipulate, augment, and/or otherwise process data segments received through one or more prior data accessing tasks.

In some embodiments, the term "masking task" refers to a data entity that represents a type of executable task. A masking task may represent a unit of work for a compute node to mask data associated with a federated query. A masking task, for example, may include one or more data masking operations related to one or more data segments for performing a portion of the federated query. By way of example, the data masking operations may include one or more data obfuscation, data tokenization, data anonymization, data modification, data filtering, data blocking, data overlaying, and/or the like operations that, when executed, mask and/or otherwise modify data segments associated with one or more prior data accessing tasks and/or one or more prior data processing tasks.

In some embodiments, the term "result set" refers to a data entity that represents a result generated by resolving a federated query. A result set may include an unmasked dataset that includes information aggregated from one or more third-party data sources in accordance with a federated query. For example, the result set may include one or more unmasked data segments, such as one or more unmasked columns, tables, and/or the like, from one or more third-party data sources. The data segments may be joined, aggregated, and/or otherwise processed to generate a particular result set. Additionally, a result set may be generated and/or configured without consideration of a set of access controls for a user identifier associated with a federated query.

In some embodiments, the term "user result set" refers to a data entity that represents a result generated by resolving a federated query in accordance with a set of access controls for a user identifier associated with a federated query. A user result set may include a masked dataset that masks one or more portions of information aggregated from one or more third-party data sources in accordance with a federated query. For example, the user result set may include one or more masked data segments, such as one or more masked columns, tables, and/or the like, from one or more third-party data sources.

In some embodiments, the term "masked data segment" refers to a masked portion of a third-party computing source. A masked data segment, for example, may include a masked segment of a data catalog corresponding to a third-party computing resource. In some examples, a masked data segment may include a masked portion of a data table with obfuscated data in accordance with a set of access controls. In addition, or alternatively, the masked data segment may include a masked portion of the data table. By way of example, the masked data segment may include one or more masked index ranges, masked columns, masked rows, and/or combinations thereof of a third-party data source.

In some embodiments, the term "set of access controls" refers to a data entity that represents one or more rules for managing data permissions across a plurality of third-party data sources. An access control may facilitate the authorization to access and/or view one or more portions of information aggregated from one or more third-party data sources in accordance with a federated query. A set of access controls may be uniquely configured for a particular user identifier, a group of user identifiers, an organization identifier, a user device identifier, and/or the like. A set of access controls may be configured based on one or more predefined attributes of a federated query. A set of access controls may additionally or alternatively be configured based on data policy information and/or data source information.

In some embodiments, the term "data policy information" refers to a data entity that represents one or more rules associated with one or more data segments. One or more portions of data policy information may be received from a data governance system for one or more third-party data sources. Data policy information may include a set of data policy standards related to accessing, storing, processing, and/or updating data associated with one or more third-party data sources. Additionally or alternatively, data policy information may include a set of data controls for data security and/or data integrity associated with one or more third-party data sources.

In some embodiments, the term "data governance system" refers to a computing entity and/or a data storage entity configured to store, maintain, and/or manage data policy information. For example, the data governance system may store, maintain, and/or manage a set of data policy standards related to accessing, storing, processing, and/or updating data associated with one or more third-party data sources. Additionally or alternatively, the data governance system may store, maintain, and/or manage a set of data controls for data security and/or data integrity associated with one or more third-party data sources.

In some embodiments, the term "data source information" refers to a data entity that represents information associated with one or more third-party data sources. One or more portions of data source information may be received from an orchestration engine for one or more third-party data sources. Data source information may include one or more data source identifiers, one or more data source protocols, one or more data source attributes, one or more data source settings, one or more data source properties, data source pipeline information, data source technology information, logical structure information, data source log information, and/or other information associated with a third-party data source.

In some embodiments, the term "orchestration engine" refers to a computing entity and/or a data storage entity configured to store, maintain, and/or manage data source information for one or more third-party data sources. For example, the orchestration engine may store, maintain, and/or manage one or more data source identifiers, one or more data source protocols, one or more data source attributes, one or more data source settings, one or more data source properties, data source pipeline information, data source technology information, logical structure information, data source log information, and/or other information associated with a third-party data source.

In some embodiments, the term "intermediary local data source" refers to a data storage entity configured to store, maintain, and/or monitor portions of one or more third-party data sources. An intermediary local data source may include a local data store, such as a local cache, and/or the like, that is configured to temporarily store one or more result sets from one or more federated queries. By way of example, the intermediary local data source may include one or more cache memories, each configured store and/or maintain a result dataset for a temporary time duration. In some examples, the intermediary local data source may be configured with one or more time intervals that specify a refresh rate, time-to-live, and/or the like for data stored within the intermediary local data source.

In some embodiments, the term "attribute set" refers to a data entity that describes a characteristic of a federated query. An attribute set may include one or more federated query attributes. A federated query attribute may be indicative of a feature, a characteristic, a property, or another type of attribute for a federated query. In some examples, a federated query attribute may be indicative of a feature, a characteristic, a property, or another type of attribute for metadata and/or a data payload of a federated query. In some examples, the attribute set may be utilized to access and/or determine one or more access controls related to a user identifier.

In some examples, a federated query attribute may be indicative of a historical access frequency for one or more data segments and/or one or more third-party data sources referenced by a federated query for a particular user identifier. The historical access frequency may be indicative of one or more access patterns for one or more data segments and/or one or more third-party data sources. By way of example, the historical access frequency may be indicative of a query count for one or more data segments and/or one or more third-party data sources. The query count may be indicative of a number of federated queries that access data from one or more data segments and/or one or more third-party data sources over a period of time.

In some examples, a federated query attribute may be indicative of a query complexity for resolving a corresponding federated query for a particular user identifier. A query complexity may be based on a syntax tree, one or more query operations, an execution plan, one or more executable tasks, and/or the like. For example, the query complexity may be based on one or more historical executable times or processing resource requirements for executing one or more portions (e.g., query operations, executable tasks, etc.) of a federated query. In some examples, the query complexity may be based on one or more third-party data sources associated with a federated query for a particular user identifier. For example, the query complexity may be based on one or more access rates, access latencies, and/or the like for the third-party data sources.

In some examples, a federated query attribute may include a data consumer threshold corresponding to a particular user identifier that initiated the federated query. For example, the data staleness threshold may be based on an execution frequency, one or more data integrity requirements, and/or the like, of an application configured to leverage one or more data segments and/or one or more third-party data sources referenced by a federated query for a particular user identifier.

IV. OVERVIEW, TECHNICAL IMPROVEMENTS, AND TECHNICAL ADVANTAGES

Various embodiments of the present disclosure address technical challenges related to traditional federated query engines. Traditional federated query engines typically generate result datasets by repeatedly pulling data segments from disparate remote data sources to resolve a complex federated query. For example, data assets are often stored on disparate on-premises data stores built using disparate database technologies. These on-premises data stores are not easily integrated with other data storage architectures, such as cloud data lake architectures. Additionally, multiple copies of data stored in the disparate data stores may cause consistency, governance, and/or maintenance overhead for the data. As such, resolving federated queries using existing federated query engines may be time consuming and/or resource intensive. Moreover, typical database systems integrate data access controls separate from query engines. For example, masked data sets are typically constructed without knowledge of information from a query engine and the masked data sets without the query engine intelligence are then merely provided to a user. As such, traditional federated query engines may inefficiently consume computing resources when masking data queries. Additionally, the masked data queries provided by traditional federated query engines may result in inaccurate data and/or insecure data.

To address these and/or other technical challenges related to traditional federated query engines, embodiments of the present disclosure present federated query processing techniques that improve traditional federated query engines by providing access control for data provided by a federated query system based on attributes of a federated query. In various embodiments, data access control for a query is provided to optimize computing resources and/or more efficiently secure data related to the query. In various embodiments, the data access control may be provided such that improved data analytics and/or data science processing of the data may be realized. The data access control may additionally provide improved querying and/or analysis of data across disparate remote data sources without generating duplicate copies of the data. In various embodiments, the data access control may provide tailored data access control to a query by dynamically masking datasets based on the attributes (e.g., a user that initiated the query, etc.) of the query. Accordingly, datasets may be dynamically masked, on-demand, in response to a query to avoid unnecessary duplication of data.

In various embodiments, the data access control may include receiving a query, user information, and/or data policy information. A local data set may be generated by resolving the query. Additionally, one or more values of the dataset may be dynamically masked based on the user information and/or data policy information. To facilitate fine-grained access control for the dataset, the masked dataset may then be displayed to a user via a graphical user interface of a user device.

In various embodiments, the data access control may be leveraged to automatically generate a dataset in response to a query. For example, a federated query may be received from a user device requesting access to multiple remote data sources. In various embodiments, the query may be parsed to convert the query into a syntax tree resolving subqueries, aggregations, and/or other functions. In response to the query, user information may be obtained, data policy information for the dataset may be requested from a governance service, and/or data source information may be requested from an orchestration service. In various embodiments, the data policy information obtained in response to the query may define a set of access controls that are correlated to the identity of the user, a user group, organization, and/or the like. For example, the set of access controls may include, but is not limited to, blocking access to, masking, and/or partially masking certain types of data.

In various embodiments, a query execution plan for resolving the query may be generated based on the data policy, the data source, and/or the user information. In various embodiments, the query may undergo analysis to be converted into the query execution plan. The query execution plan may be a logical plan in the form of hierarchical nodes that denotes the flow of input from various sub-nodes. The resulting query execution plan may also undergo a query optimization phase where the physical plans and execution strategies are generated.

In various embodiments, the query execution plan may be utilized to generate a result set (e.g., a local dataset) for the query and/or to store the result set in intermediate memory. In various embodiments, the result set may include masked and unmasked data such that, in response to a query, a user may be automatically provided access to information that is tailored to credentials of the user. In various embodiments, the result set may additionally be overlaid with one or more tokens and/or masks based on the data policy, the data source, and/or the user information. In various embodiments, the overlaid result set may be provided for display via a graphical user interface in response to the query.

In some embodiments, a query is received via an API gateway of the federated query system. In some embodiments, the query is received from a client device. The query may then be routed to a web service of the federated query system that exposes APIs for submitting queries and/or retrieving query statuses. The federated query system may store the request in a queue for subsequent processing after validating fair usage quotas, permissions, costs, idempotency checks, and/or other information. Moreover, the federated query system may be configured for executing and/or monitoring queries. For example, the federated query system may receive the queued request through event triggers. The federated query system may also analyze the shape of the query (e.g., query pattern, etc.) and/or determine a particular query engine to handle the query. The federated query system may then submit the query to either a first federated query engine or a second federated query engine (e.g., a cloud federated query engine or an on-premises federated query engine). Results of the queries may be persisted as materialized data for consumption via a user interface and/or a physical location of the materialized data may be saved as metadata of the query so that the federated query system may transmit storage details to client devices for direct storage access.

In doing so, various embodiments of the present disclosure address shortcomings of existing federated query solutions and enable solutions that are capable of efficiently and reliably querying data from disparate data sources with user access controls. For example, federated queries associated with user access controls may be resolved in a shorter amount of time and/or by utilizing fewer computing resources as compared to existing federated query solutions. Example inventive and technologically advantageous embodiments of the present disclosure additionally include improved data analytics, data processing, and/or machine learning with respect to data from disparate data sources. Example inventive and technologically advantageous embodiments of the present disclosure additionally include improved quality and/or security of data obtained from disparate data sources (e.g., improved consistency, governance, and/or maintenance overhead for data).

Additionally, computing resource allocation for a federated query systems may be improved by integrating data access control with query processing. In this regard, example inventive and technologically advantageous embodiments of the present disclosure include (i) data access control schemes for assessing data in response to queries to the data to provide data access control tailored to a user associated with a federated query, (ii) improved utilization of query downtime for a federated query system by combining data access control functions with real-time query operations to simultaneously assess a dataset while resolving a federated query with data access controls, (iii) improved data visualizations for visualizing masked queried data in the context of user access control for the queried data, among other advantages.

V. EXAMPLE SYSTEM OPERATIONS

As indicated, various embodiments of the present disclosure make important technical contributions to federated query processing technology. In particular, systems and methods are disclosed herein that implement federated query processing techniques for providing access control for data provided by a federated query system based on attributes of a federated query. Unlike traditional query techniques, the query processing techniques of the present disclosure leverage execution plans and data access controls to generate masked results for federated queries, on-demand, that are tailored to the individual characteristics of the federated query.

Figure 3:
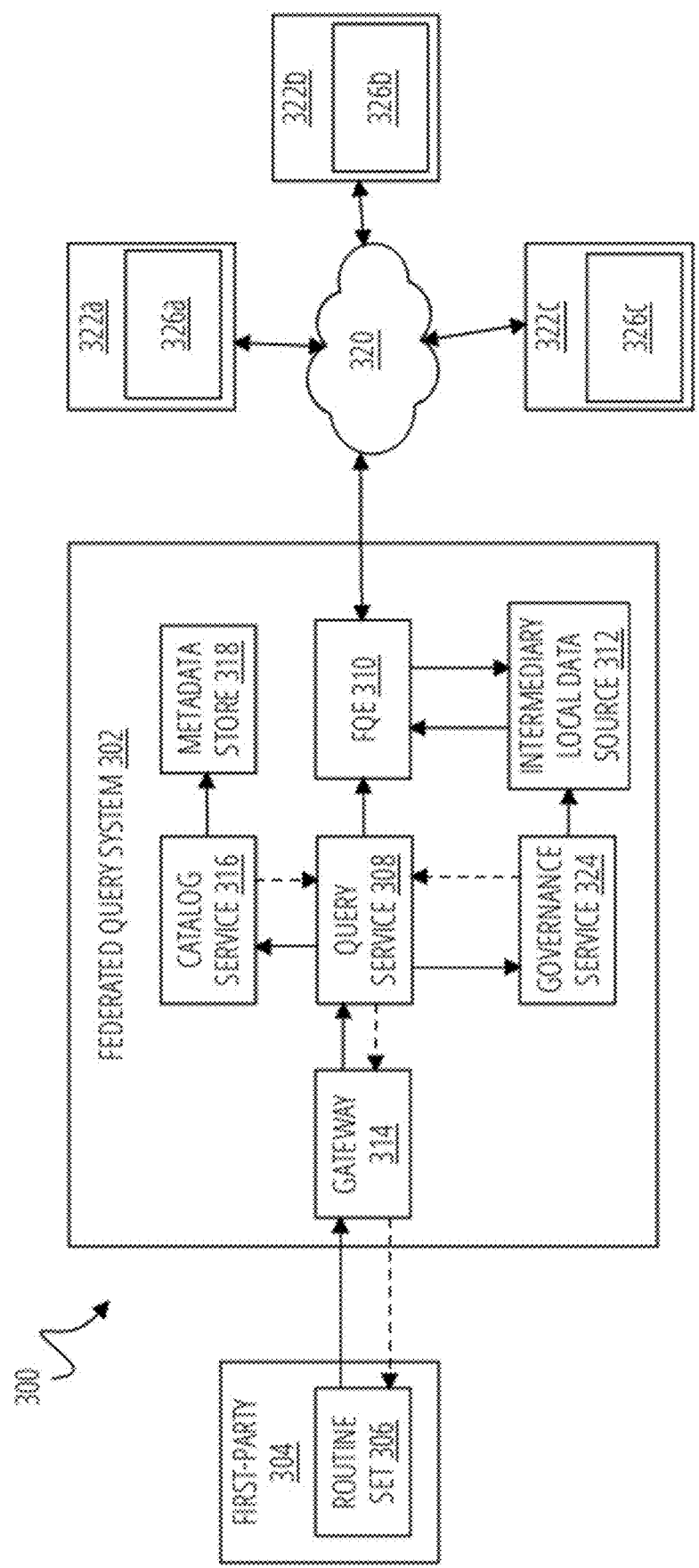
FIG. 3 is a system diagram showing example computing entities for facilitating a federated query service in accordance with some embodiments discussed herein.

FIG. 3 is a system diagram 300 showing example computing entities for facilitating a federated query service in accordance with some embodiments discussed herein. The system diagram 300 includes a first party 304, a federated query system 302, and a plurality of third-party data sources 322a-c. The federated query system 302 may be configured to facilitate a plurality of computing functionalities to provide a seamless experience for the first party 304, such as a data analytics and/or science user, to query and analyze data across the plurality of third-party data sources 322a-c without the need make duplicate copies of the data. Using some of the techniques of the present disclosure, the federated query system 302 optimizes data store coverage, speed of analytics, and correctness of data to provide a near real time experience for all analytical use cases.

In some embodiments, the federated query system 302 is a computing entity that is configured to perform an intermediary query processing service between the first party 304 and the plurality of third-party data sources 322a-c. The federated query system 302 may define a single point of consumption for a first party 304. The federated query system 302 may leverage a federated query engine to enable analytics by querying data where is it is maintained (e.g., third-party data sources, etc.), rather than building complex ETL pipelines.

In some embodiments, the first party 304 accesses the federated query system 302 to initiate a federated query to one or more of the plurality of third-party data sources 322a-c. For example, the first party 304 may leverage a routine set 306 for the federated query system 302 to submit a federated query to the federated query system 302. The federated query system 302 may include an application programming interface (API) gateway 314 for securely receiving the federated query. The gateway 314 may verify and/or route the federated query to the query service 308.

In some embodiments, the first party 304 is a computing entity that is associated with a query-based action. The first party may include a computing system, platform, and/or device that is configured to initiate a query to one or more of the plurality of third-party data sources 322a-c. For example, the first party 304 may include a first party platform that is configured to leverage data from one or more disparate data sources to perform a computing action. The first party platform may include a machine learning processing platform configured to facilitate the performance of one or machine learning models, a data processing platform configured to process, monitor, and/or aggregate large datasets, and/or the like.

To improve computing efficiency and enable the aggregation of data across multiple disparate datasets, the first party 304 may generate a federated query that reference datasets from multiple third parties and submit the federated query to one intermediary query processing service (e.g., federated query system 302) configured to efficiently receive the queried data from the third parties and return the data to the first party 304. In some examples, the first party 304 may have access to a query routine set (e.g., software development kit (SDK), etc.) that may be leveraged to wrap a query submission, acknowledgment, status polling, and/or result fetching APIs to deliver a synchronous experience between the first party 304 and the intermediary query processing service.

In some embodiments, a federated query is a data entity that represents a query to a plurality of third-party data sources 322a-c. The federated query may include a logical query statement that defines a plurality of query operations for receiving and processing data from multiple, different, third-party data sources 322a-c. In some examples, the federated query may be generated using one or more query functionalities of the routine set 306.

In some embodiments, a query operation is a data entity that represents a portion of a federated query. A query operation may include data expression, such as a SQL expression, which may represent a primitive computing task for executing a portion of a federated query. A query operation, for example, may include a search/scan operation for receiving data from a third-party data source, a join operation for joining two data segments, and/or the like.

In some embodiments, a third-party data source is a data storage entity configured to store, maintain, and/or monitor a data catalogue. A third-party data source may include a heterogenous data store that is configured to store a data catalogue using specific database technologies, such as Netezza, Teradata, and/or the like. A data store, for example, may include a data repository, such as a database, and/or the like, for persistently storing and managing collections of structured and/or unstructured data (e.g., catalogues, etc.). A third-party data source may include an on-premises data store including one or more locally curated data catalogues. In addition, or alternatively, a third-party data source may include a remote data store including one or more cloud-based data lakes, such as Vulcan, Level2, and/or the like. In some examples, a third-party data source may be built on specific database technologies that may be incompatible with one or more other third-party data sources. Each of the third-party data sources may define a data catalogue that, in some use cases, may include data segments that could be aggregated to perform a computing task.

By way of example, the federated query system 302 may be associated with a plurality of third-party data sources 322a-c that may include a first third-party data source 322a, a second third-party data source 326b, a third third-party data source 322c, and/or the like. Each of the plurality of third-party data sources 322a-c may include a standalone, incompatible, data sources. The first third-party data source 322a, for example, may include a first third-party dataset 326a that is separate from a second third-party data source 326b and/or a third third-party dataset 326c of the second third-party data source 322b and third third-party data source 322c, respectively. Each of the plurality of third-party data sources 322a-c may include any type of data source. As an example, the first third-party data sources 322a may include a first cloud-based dataset, the second third-party data source 322b may include an on-premises dataset, the third third-party data source 322c may include a second cloud-based dataset, and/or the like.

In some embodiments, the query service 308 receives a federated query from the first party 304 through the gateway 314. The federated query may reference one or more data segments from the plurality of third-party data sources 322a-c. A data segment may be a portion of a respective third-party computing source of the plurality of third-party data sources 322a-c. The query service 308 may perform one or more operations to facilitate the optimal generation of a result set in response to the federated query. To do so, the query service 308 may leverage one or more sub-components of the federated query system 302. The one or more sub-components may include the federated query engine 310, the catalog service 316, the governance service 324, the intermediary local data source 312, the metadata store 318, and/or the like.

In some embodiments, the federated query engine 310 is a computing entity that is configured to execute federated query across heterogenous data store technologies. The federated query engine 310 may be configured to implement an execution strategy to generate an optimal execution plan for a federated query. The execution plan may define a sequence of operations, a timing for the sequence of operations, and/or other contextual information for optimally executing a complex federated query. The federated query engine 310, may leverage optimization techniques, such as Predicate and Limit pushdown, Column-Pruning, Join re-ordering, Parallelization, and/or other cost-based optimization techniques to arrive at an execution strategy of the joins, aggregations, and/or the like.

The federated query engine 310 may be configured to leverage a massively parallel processing (MPP) architecture to simultaneously execute multiple portions of a federated query to optimize computing performance. For example, the federated query engine 310 may schedule one or more portions of the execution plan for execution across one or more distinct compute nodes which then connect to the plurality of third-party data sources 322a-c to execute parts of splits of the execution plan on the plurality of third-party data sources 322a-c. In this manner, a result set may be generated across multiple compute nodes and then transferred back to the executor (worker) nodes which processes intermediate results.

In some embodiments, the catalog service 316 is a computing entity that is configured to identify a mapping between a data segment and a third-party data source. For example, the catalog service 316 may maintain a table name path for each data table associated with (e.g., registered with, etc.) the federated query system 302. By way of example, the plurality of third-party data sources 322a-c may be previously registered with the federated query system 302. During registration, the catalog service 316 may be modified to include a mapping to each data table of a respective data catalog of a third-party data source. The mapping may include a table name path that identifies a path for accessing a particular table of a third-party data source.

In some embodiments, a table name path is a data entity that represents a qualifiable table name for a data table. A table name path, for example, may identify a third-party data source, a schema, and/or a table name for the data table. The table name may include a third-party defined name. In some examples, the table name may correspond to one or more table name aliases defined by the third-party and/or one or more other entities. The catalog service 316 may record the table name path, the table name, and/or any table name aliases for a respective data table.

In some examples, the mapping for a respective data table may be modifiable to redirect a request to a data table. For instance, the catalog service 316 may be configured to communicate with the plurality of third-party data sources 322a-c to maintain a current mapping for each data table of the plurality of third-party data sources 322a-c. In addition, or alternatively, the catalog service 316 may interact with the query service 308 to redirect a request to a data table, and/or portion thereof, to an intermediate local data source as described herein.

In some embodiments, the catalog service 316 maintains a metadata store 318 that includes metadata for each of the plurality of third-party data sources 322a-c. The metadata store 318 may be populated for each of the plurality of third-party data sources 322a-c during registration. The metadata may include access parameters (e.g., security credentials, data access controls, etc.), performance attributes (e.g., historical latency, data quality, etc.), access trends, quality evaluation data, and/or the like for each of the plurality of third-party data sources 322a-c.

In some examples, the catalog service 316 may maintain a current state for a federated query system 302. The current state may be indicative of a plurality of historical result set hashes corresponding to a plurality of recently resolved federated queries and/or one or more query counts for each of the historical result set hashes. In some examples, the plurality of historical result set hashes may identify one or more locally stored result sets that are currently stored in one or more intermediary local data sources 312.

In some embodiments, the federated query system 302 includes a governance service 324 configured to manage access to the intermediary local data source 312. The governance service 324, for example, may include a computing entity that is configured to authorize and/or audit access to one or more local and/or remote data assets. The governance service 324 may define governance criteria for data classification, usage rights, and/or access controls to intermediary local data source 312 and/or the plurality of third-party data sources 322a-c.

In some embodiments, the intermediary local data source 312 refers to a data storage entity configured to store, maintain, and/or monitor portions of the plurality of third-party data sources 322a-c. An intermediary local data source 312 may include a local data store, such as a local cache, and/or the like, that is configured to temporarily store one or more data segments from one or more of the plurality of third-party data sources 322a-c. By way of example, the intermediary local data source 312 may include one or more cache memories, each configured to store and/or maintain a data segment and/or a result dataset for a temporary time duration. In some examples, the intermediary local data source 312 may be leveraged with one or more optimization techniques of the present disclosure to intelligently retrieve and store result sets for unique federated queries.

In some embodiments, the query service 308 is configured to facilitate data access controls and/or generation of masked result sets for federated queries using attributes of the federated queries. An example of a data access control scheme will now further be described with reference to FIG. 4.

Figure 4:
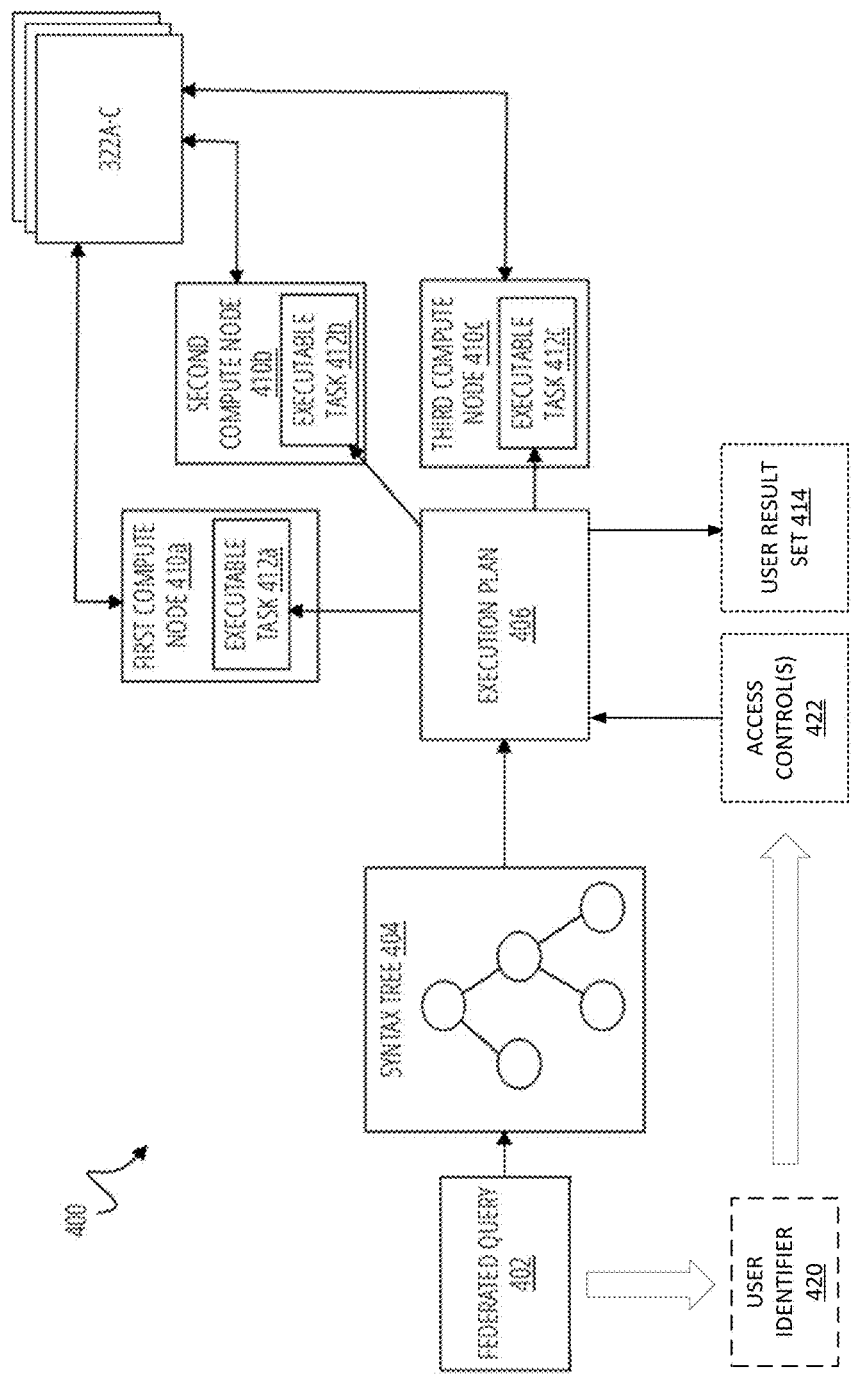
FIG. 4 is a dataflow diagram showing example data structures for providing access control for data provided by a federated query system based on attributes of a federated query in accordance with some embodiments discussed herein.

FIG. 4 is a dataflow diagram 400 showing example data structures for providing access control for data provided by a federated query system based on attributes of a federated query in accordance with some embodiments discussed herein. The dataflow diagram 400 depicts a set of data structures and computing entities for optimally resolving a federated query across a plurality of third-party data sources 322a-c using an execution plan 406 with a plurality of parallelizable executable tasks 412a-c.

In some embodiments, a federated query 402 is received that references a plurality of data segments from one or more of the plurality of third-party data sources 322a-c. For example, each of the data segments may be referenced by one or more query operations of the federated query 402. In some embodiments, the federated query 402 is received via the gateway 314 of the federated query system 302 communicatively coupled to the third-party data sources 322a-c. In some embodiments, the gateway 314 is configured as an API gateway. For instance, the federated query 402 may be received via one or more APIs of the gateway 314.

In some embodiments, a data segment is a portion of a third-party computing source. A data segment, for example, may include a segment of a data catalog corresponding to a third-party computing resource. In some examples, a data segment may include a data table stored by a third-party data source. In addition, or alternatively, the data segment may include a portion of the data table. By way of example, the data segment may include one or more index ranges, columns, rows, and/or combinations thereof of a third-party data source.

In some embodiments, the federated query 402 includes and/or is correlated with a user identifier 420. For example, the user identifier 420 associated with the federated query 402 may be identified to facilitate resolution of the federated query 402 and/or data access controls related to the federated query 402. In some embodiments, the user identifier 420 is included in a header portion, a data segment portion, metadata, or another portion of the federated query 402. Alternatively, user device information, network address information, and/or other information associated with the user device may be correlated with the user identifier 420. The user identifier 420 may identify a user or a user device associated with the federated query 402.

In some embodiments, a set of access controls 422 for the plurality of third-party data sources 322a-c is determined based on the user identifier 420. The set of access controls 422 may represent one or more rules for managing data permissions for the user identifier 420 across the plurality of third-party data sources 322a-c. For example, the set of access controls 422 may facilitate authorization of the user identifier 420 to access and/or view one or more portions of information aggregated from the plurality of third-party data sources 322a-c in accordance with the federated query 402.

In some embodiments, the federated query 402 references one or more data segments from the plurality of third-party data sources 322a-c. For example, the federated query 402 may reference a namespace associated with one or more mappings for one or more data segments from the plurality of third-party data sources 322a-c. The namespace may include a series of operations to be performed to generate the one or more data segments from the plurality of third-party data sources 322a-c. In some embodiments, the federated query 402 may include a pointer data object that includes a reference or memory address for the one or more data segments from the plurality of third-party data sources 322a-c.

In some embodiments, data policy information associated with the one or more data segments is determined for the federated query 402. The data policy information may be received from a data governance system for the plurality of third-party data sources 322a-c. In addition, or alternatively, the data policy information may be received from the plurality of third-party data sources 322a-c. In some examples, the data policy information may include a set of data policy standards related to accessing, storing, processing, and/or updating data associated with the plurality of third-party data sources 322a-c. In some examples, the data policy information may include one or more data access controls for data security and/or data integrity associated with the plurality of third-party data sources 322a-c.

In some embodiments, data source information associated with the one or more data segments is determined for the federated query 402. One or more portions of data source information may be received from an orchestration engine for the plurality of third-party data sources 322a-c. In addition, or alternatively, the data source information may be received from the plurality of third-party data sources 322a-c. In some examples, the data source information may include one or more data source identifiers, data source protocols, data source attributes, data source settings, data source properties, data source pipeline information, data source technology information, logical structure information, data source log information, and/or other information associated with the plurality of third-party data sources 322*a-c*.

In some examples, a set of access controls 422 may be generated for the federated query based on the data policy information, the data source information, and/or the user identifier 420.

In some embodiments, the federated query 402 is resolved based on the user identifier 420 and the referenced one or more data segments to generate a result set. In some embodiments, the result set is a data entity that represents a result generated by resolving a federated query 402. A result set may include a dataset that includes information aggregated from one or more of the plurality of third-party data sources 322*a-c* in accordance with the federated query 402. For example, the result set may include one or more data segments, such as one or more columns, tables, and/or the like, from one or more of the third-party data sources 322*a-c*. The data segments may be joined, aggregated, and/or otherwise processed to generate a particular result set.

The federated query 402 may be resolved in accordance with the execution plan 406 for the federated query 402. In some embodiments, the execution plan 406 may be identified for executing the federated query 402 via one or more executable tasks with respect to the plurality of third-party data sources 322*a-c*. For example, the execution plan 406 may be received, determined, and/or otherwise utilized for the federated query 402. The execution plan 406 may also include a plurality of executable tasks 412*a-c* for resolving the federated query 402. In some embodiments, the execution plan may include the plurality of executable tasks 412*a-c* for generating a result set from the plurality of third-party data sources 322*a-c*. In some embodiments, the execution plan 406 may be identified in response to determining that the one or more executable tasks of the plurality of executable tasks 412*a-c* satisfy defined criteria for the one or more data segments associated with the user identifier 420. For example, the defined criteria for the one or more data segments may indicate whether execution of a particular executable task with respect to the plurality of third-party data sources 322*a-c* is needed to obtain data associated with one or more data segments. In some examples, the defined criteria may depend on whether data associated with the one or more data segments is cached in memory such that a particular executable task with respect to the plurality of third-party data sources 322*a-c* is not needed in order to access the data.

In some embodiments, the execution plan 406 is received from a federated query engine. For example, a query service may receive the federated query 402 and provide the federated query 402 to the federated query engine for processing. The federated query engine may, in response to the federated query 402, generate the execution plan 406 in accordance with an optimized execution strategy and provide the execution plan 406 for the federated query 402 to the query service.

In some embodiments, the execution plan 406 is a data entity that represents an optimized plan for executing a federated query 402. The execution plan 406 may be generated by a federated query engine in accordance with an execution strategy. The execution strategy may be designed to optimize the resolution of a federated query 402 by breaking the federated query 402 into a plurality of serializable units of work (e.g., executable tasks 412*a-c*) that may be distributed among one or more compute nodes 410*a-c*.

In some examples, the execution plan 406 is generated based on a syntax tree 404 for the federated query 402. For instance, the federated query 402 may be converted to the syntax tree 404 to define each of the query operations of the federated query 402 and the relationships therebetween.

In some embodiments, the syntax tree 404 is a data entity that represents a parsed federated query. The syntax tree 404 may include a tree data structure, such as directed acyclic graph (DAG), and/or the like, that includes a plurality of nodes and a plurality of edges connecting one or more of the plurality of nodes. Each of the plurality of nodes may correspond to a query operation for executing at least a portion of the federated query 402. The plurality of edges may define a sequence for executing each query operation represented by the plurality of nodes. By way of example, the federated query 402 may be parsed to extract a plurality of interdependent query operations from the federated query 402. The plurality of interdependent query operations may include computing functions related to data accessing tasks and/or data processing tasks that may rely on an input from a previous computing function and/or provide an input to a subsequent computing function. As one example, a first data scan function related to a data accessing task may be performed to retrieve a data segment from a third-party data source before a second data join function related to a data processing task is performed using the data segment. The syntax tree 404 may include a plurality of nodes and/or edges that define the query operations (e.g., the nodes) and the relationships (e.g., the edges) between each of the query operations of the federated query 402.

In some embodiments, the syntax tree 404 is configured based on the set of access controls 422. For example, the plurality of nodes and/or edges that define the query operations (e.g., the nodes) and the relationships (e.g., the edges) between each of the query operations of the federated query 402 may be configured based on the set of access controls 422.

In some embodiments, the syntax tree 404 is converted to a logical plan in the form of hierarchical nodes that denote the flow of input from various sub-nodes. The logical plan may be optimized, using one or more optimization techniques, to generate an execution plan 406 in accordance with an execution strategy. In some embodiments, the execution plan 406 may be generated based on a version of the syntax tree 404 configured based on the set of access controls 422. The optimization techniques may include any type of optimization function including, as examples, Predicate and Limit pushdown, Column-Pruning, Join re-ordering, Parallelization, and/or other cost-based optimization techniques. The portions (e.g., executable tasks 412*a-c*) of the execution plan 406 may be scheduled across distinct compute nodes 410*a-c* to be performed in parallel to generate intermediate result sets. Each of the compute nodes 410*a-c*, for example, may individually connect to one or more of the plurality of third-party data sources 322*a-c* to execute at least one executable task of the execution plan 406. The execution of each executable task may generate intermediate results. The intermediate results from each execution task may be transferred to one compute node to generate a result set.

In some embodiments, an executable task is a data entity that represents a portion of an execution plan 406. An executable task may represent a unit of work for a compute node to perform a portion of a federated query 402. By way of example, an executable task may include one or more query operations for performing a portion of the federated query 402.

In some embodiments, to optimize the resolution of a federated query 402, an execution plan 406 is split into multiple independently executable tasks 412a-c. By way of example, the executable tasks 412a-c may include a first executable task 412a, a second executable task 412b, a third executable task 412c, and/or the like. Each of the executable tasks 412a-c may be individually scheduled across a plurality of compute nodes 410a-c. For example, the first executable task 412a may be scheduled for execution by a first compute node 410a, the second executable task 412b may be scheduled for execution by a second compute node 410b, the third executable task 412c may be scheduled for execution by a third compute node 410c, and/or the like.

In some embodiments, execution of the one or more executable tasks includes establishing communication with an orchestration engine for the plurality of third-party data sources 322a-c. For example, the plurality of third-party data sources 322a-c may include and/or be communicatively coupled to one or more orchestration engine systems configured manage access to the plurality of third-party data sources 322a-c based on the one or more executable tasks associated with the execution plan 406. In some embodiments, the execution plan 406 may identify the one or more orchestration engine systems for the one or more executable tasks associated with the execution plan 406. In some embodiments, one or more of the compute nodes 410a-c may correspond to the one or more orchestration engine systems. In some embodiments, the one or more orchestration engine systems are configured to provide load balancing and/or monitoring of the one or more executable tasks associated with the execution plan 406 with respect to the plurality of third-party data sources 322a-c. In some embodiments, the one or more orchestration engine systems may provide the one or more data segments associated with the federated query 402.

In some embodiments, the plurality of executable tasks 412a-c respectively include one or more data accessing tasks, one or more data processing tasks, and/or one or more other tasks for performing one or more portions of the federated query 402. In some embodiments, a data processing tasks include one or more machine learning tasks, masking tasks, and/or the like.

Each of the compute nodes 410a-c may include individual processing units that may provide storage, networking, memory, and/or processing resources for performing one or more computing tasks related to the plurality of executable tasks 412a-c. In some examples, the compute nodes 410a-c may simultaneously operate to execute one or more of the executable tasks 412a-c in parallel. In some examples, the compute nodes 410a-c may simultaneously operate to execute one or more data accessing tasks and/or one or more data processing tasks related to the plurality of executable tasks 412a-c. Intermediate results from each of the compute nodes 410a-c may be aggregated to generate a result set.

In some embodiments, execution of the one or more executable tasks results in a result set from the plurality of third-party data sources 322a-c being generated. In some embodiments, the result set is generated using a first portion of the execution plan 406. For example, the result set may be generated by performing one or more data accessing tasks and/or one or more data processing tasks with respect to the plurality of third-party data sources 322a-c. The result set may represent a result generated by resolving the federated query 402. Additionally, the result set may include a dataset that includes information aggregated from the plurality of third-party data sources 322a-c in accordance with the federated query 402. For example, the result set may include one or more data segments, such as one or more columns, tables, and/or the like, from one or more third-party data sources. The data segments may be joined, aggregated, and/or otherwise processed to generate a particular result set.

In some embodiments, a user result set 414 is generated using a second portion of the execution plan 406. For example, the result set may be generated by performing one or more masking tasks with respect to the result set. The user result set 414 may mask a portion of the information for the result set in accordance with the set of access controls 422. For example, the one or more masking tasks with respect to the result set may be performed in accordance with the set of access controls 422. Based on the configuration of the set of access controls 422, the user result set 414 may be generated in accordance with the user identifier 420, the data policy information, and/or the data source information.

In some embodiments, the result set generated using the first portion of the execution plan 406 is stored in a cache memory. Additionally, based on an attribute set associated with the federated query 402, a first version of the user result set 414 and/or a second version of the user result set 414 may be generated. For example, the first version of the user result set 414 may mask a first portion of the information for the result set in accordance the set of access controls 422. Alternatively, the second version of the user result set 414 may mask a second portion of the information for the result set in accordance the set of access controls 422. In some embodiments, the attribute set describes one or more characteristics of the federated query 402. The attribute set may include one or more federated query attributes for the federated query 402. A federated query attribute may be indicative of a feature, a characteristic, a property, or another type of attribute for the federated query 402. In some examples, a federated query attribute may be indicative of a feature, a characteristic, a property, or another type of attribute for metadata and/or a data payload of the federated query 402.

In some examples, the attribute set (e.g., one or more federated query attributes of the federated query 402) is utilized to access and/or determine one or more of the set of access controls 422. For example, the one or more federated query attributes of the federated query 402 may respectively describe a characteristic of the federated query 402. In some examples, the one or more federated query attributes of the federated query 402 may be indicative of an organization, enterprise, or provider identifier associated with the federated query 402, a database identifier associated with the federated query 402, a data type mapping associated with the federated query 402, a purpose for a query statement associated with the federated query 402, a type of the federated query 402, an encryption type associated with the federated query 402, an authentication level associated with the federated query 402, a priority of the federated query 402, a historical query log for a user issuing the federated query 402, a user profile for a user associated with the federated query 402, a geographic location for a user associated with the federated query 402, and/or another type of federated query attribute associated with the federated query 402.

In some examples, the one or more federated query attributes of the federated query 402 may be indicative of a historical access frequency for one or more data segments previously utilized by the user identifier 420. The historical access frequency may be indicative of one or more access patterns for the one or more data segments. By way of example, the historical access frequency may be indicative of a query count for the one or more data segments. In some embodiments, a query count is a data entity that represents a number of historical queries associated with the federated query 402 over a time duration. In some examples, the historical number of queries may be associated with a time range. The time range may include a time duration preceding a current time such that the query count is dynamically updated based on the current time. In addition, or alternatively, the time range may include a time window with particular start and end times. The start and end times may include a time of day, a day of the week, week of the month, and/or the like.

In some examples, the one or more federated query attributes of the federated query 402 may be indicative of a query complexity for resolving the federated query 402. A query complexity may be based on the syntax tree 404, one or more query operations, the execution plan 406, the executable tasks 412a-c, and/or the like. For example, the query complexity may be based on one or more historical execution times or processing resource requirements for executing one or more portions (e.g., query operations, executable tasks 412a-c, etc.) of the federated query 402. In some examples, the query complexity may be based the third-party data sources 322a-c associated with a federated query 402. For example, the query complexity may be based on one or more access rates, access latencies, and/or the like for the third-party data sources 322a-c. In some examples, the query complexity is based on the logical dataset. For example, the query complexity may be based on a total number of logical datasets in the federated query 402, a historical complexity associated with the logical dataset. and/or one or more other factors related to the logical dataset.

In some embodiments, a query response with the user result set 414 is provided to a user device associated with the user identifier 420. The query response may be a response to the federated query 402. Additionally, the query response may be provided to render masked visual data associated with the user result set 414 via a user interface of the user device. For example, the masked visual data may include a masked dataset that masks one or more portions of information aggregated from the third-party data sources 322a-c in accordance with the federated query 402. In some examples, the masked visual data may include one or more masked data segments, such as one or more masked columns, tables, and/or the like, from the third-party data sources 322a-c in accordance with the federated query 402. In some embodiments, the masked visual data may be configured to overlay a visual mask, a token, or another visual data obfuscation over one or more values of the user result set 414.

By way of example, the user result set 414 may include a plurality of patient attributes for a clinical use case. In such a case the patient attributes may include clinical attributes and protected attributes, such as personally identifiable information (PII). In some examples, the protected attributes may be retrieved and/or stored with the clinical attributes to generate a result set. In such a case, the protected attributes may be masked to generate the user result set 414 and/or the masked visual data (e.g., when the user result set 414 is provided to a user device for the user via a query response). The number and/or type of attributes of a result set that are masked may be dynamical changed in real time such that one copy of data (e.g., a cached result set) may be used to generate a plurality of different user result sets with different levels of visibility. This allows a query system to provide a plurality of different results to the same query without duplication of data.

As described herein, due to the complexity of federated queries to multiple disparate data sources, traditional federated query engines may be unable to efficiently and/or securely query disparate data sources to generate a response for a federated query. Some embodiments of the present disclosure provide improvements to traditional federated query techniques by providing access control for data provided via data accessing tasks and/or data processing tasks related to an execution plan for a federated query. An example of executing an execution plan based on access controls and according to one or more embodiments disclosed herein will now further be described with reference to FIG. 5.

Figure 5:
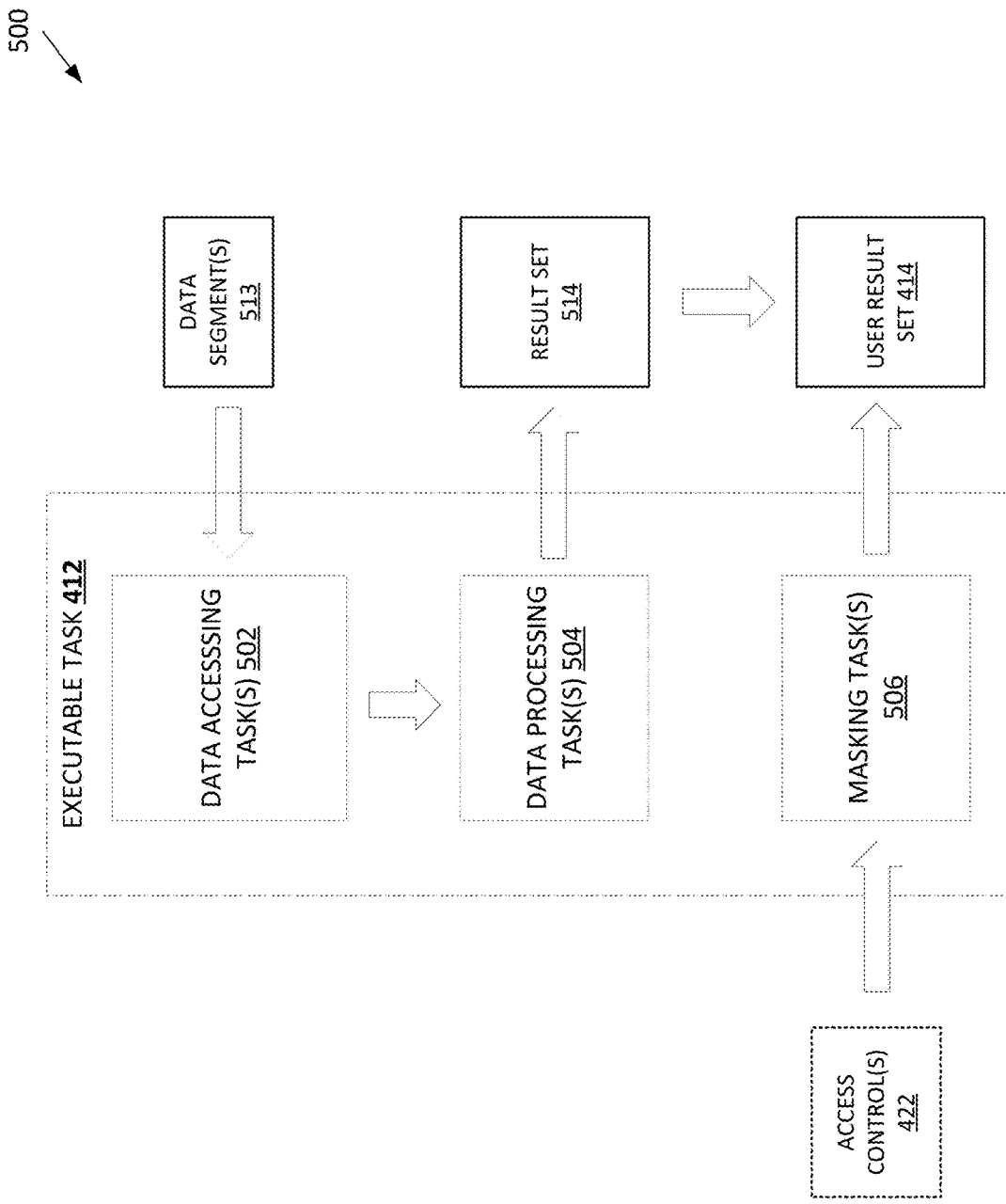
FIG. 5 is a dataflow diagram showing example data structures resulting from execution of data accessing tasks, data processing tasks, and/or masking for a federated query in accordance with some embodiments discussed herein.

FIG. 5 is a dataflow diagram 500 showing example data structures resulting from execution of data accessing tasks, data processing tasks, and/or masking tasks for a federated query in accordance with some embodiments discussed herein. The dataflow diagram 500 includes an executable task 412. The executable task 412 may be configured as one or more data accessing tasks 502, one or more data processing tasks 504, and/or one or more masking tasks 506. For example, the executable task 412 may be configured as a unit of work for a compute node to perform one or more data accessing operations, one or more data processing operations, and/or one or more masking operations.

The one or more data accessing tasks 502 may access the plurality of third-party data sources 322a-c to retrieve one or more data segments 513 according to the federated query 402. In some embodiments, the one or more data segments 513 are referenced by the federated query 402. The one or more data processing tasks 504 may process, monitor, aggregate, augment, sort, and/or filter data from the one or more data segments 513 to generate at least a portion of a result set 514 associated with the one or more data segments 513. The one or more data processing tasks 504 may additionally or alternatively perform data analytics with respect to retrieved data associated with the one or more data segments 513. In some embodiments, the one or more data processing tasks 504 may include one or more machine learning tasks that process data from the one or more data segments 513 via one or more machine learning techniques to generate at least a portion of the result set 514. In addition, or alternatively, the one or more machine learning tasks may analyze data from the one or more data segments 513 via one or more machine learning techniques to determine one or more predictions, inferences, and/or classifications related to the one or more data segments 513. In some examples, the one or more machine learning tasks may execute one or more machine learning models with respect to retrieved data associated with the one or more data segments 513.

A data accessing task of the one or more data accessing tasks 502 may include one or more executable tasks for accessing data from the plurality of third-party data sources 322a-c. For example, a data accessing task may include one or more query operations for scanning and/or projecting a data table (and/or segment thereof) from a third-party data source. In some examples, a data accessing task may be executed to access the one or more data segments 513 from the plurality of third-party data sources 322a-c.

A data processing task of the one or more data processing tasks 504 may include one or more executable tasks for processing data and/or the one or more data segments 513 related to the plurality of third-party data sources 322a-c. For instance, a data processing task may be configured to process the one or more data segments 513 from the plurality of third-party data sources 322a-c to generate at least a portion of the result set 514 for the federated query 402. In some examples, a data processing task may include one or more query operations for joining one or more portions of a data table and/or other query operations for processing the one or more data segments 513 retrieved from the plurality of third-party data sources 322a-c, as described herein.

In some embodiments, a data processing task includes a machine learning-based task for processing data and/or the one or more data segments 513 related to the plurality of third-party data sources 322a-c via machine learning. For instance, a machine learning task may be configured to process the one or more data segments 513 from the plurality of third-party data sources 322a-c via one or more machine learning models to generate at least a portion of the result set 514 for the federated query 402. In some examples, a machine learning task may include one or more machine learning operations for providing predictions, inferences, and/or classifications related to one or more portions of a data table and/or other data segments retrieved from the plurality of third-party data sources 322a-c, as described herein. In some examples, a machine learning task may involve supervised learning, unsupervised learning, semi-supervised learning, reinforcement learning, deep learning, and/or another type of machine learning.

Based on the set of access controls 422, the one or more masking tasks 506 perform masking with respect to the result set 514 to provide the user result set 414. For example, the one or more masking tasks 506 may include one or more data masking operations related to the one or more data segments 513 for performing a portion of the federated query 402. By way of example, the one or more masking tasks 506 may include one or more data obfuscation, data tokenization, data anonymization, data modification, data filtering, data blocking, data overlaying, and/or the like operations that, when executed, mask and/or otherwise modify the result set 514 and/or other data associated with the one or more data segments 513.

In some embodiments, a response to the federated query 402 is generated based on the user result set 414 such that improved flexibility, security, and/or redundancy of data for the response is provided via the set of access controls 422. The improved response may also provide improved security and/or performance for an external computing entity (e.g., a user device) that receives the response.

Figure 6:
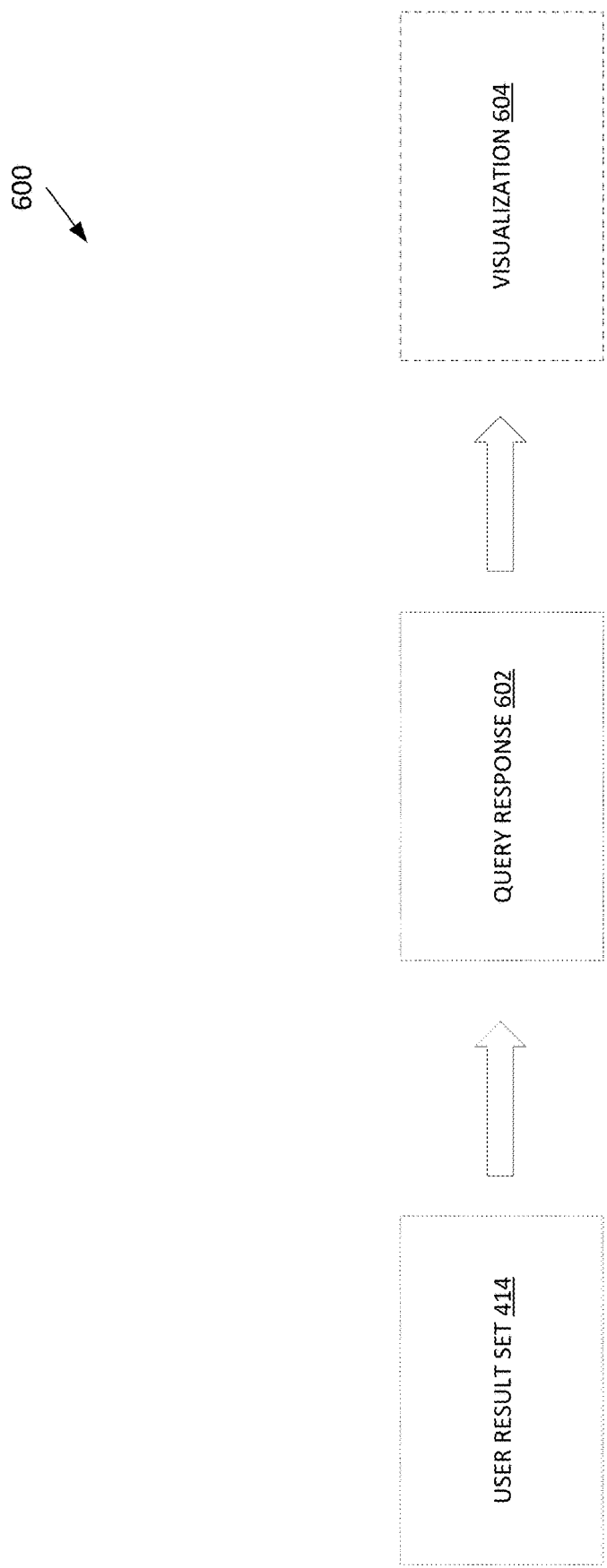
FIG. 6 is a dataflow diagram showing example data structures resulting from a user result set in accordance with some embodiments discussed herein.

FIG. 6 is a dataflow diagram 600 showing example data structures resulting from masking of a result set in accordance with some embodiments discussed herein. In some embodiments, a query response 602 for the federated query 402 is generated based on the user result set 414. For example, the query response 602 may include the user result set 414 and/or masked visual data associated with the user result set 414. Furthermore, the query response 602 may be provided to a computing entity (e.g., an external computing entity from the external computing entity 112a-c) associated with the federated query 402 to render masked visual data associated with the user result set 414 via visualization 604. In some embodiments, the visualization 604 may be rendered via a user interface of the computing entity. The visualization 604 may include, for example, one or more graphical elements for an electronic interface (e.g., an electronic interface of a user device) based on the query response 602. In some embodiments, the visualization 604 may render unmasked data and masked data related to the user result set 414. In some embodiments, the visualization 604 may alternatively render only unmasked data related to the user result set 414.

Figure 7:
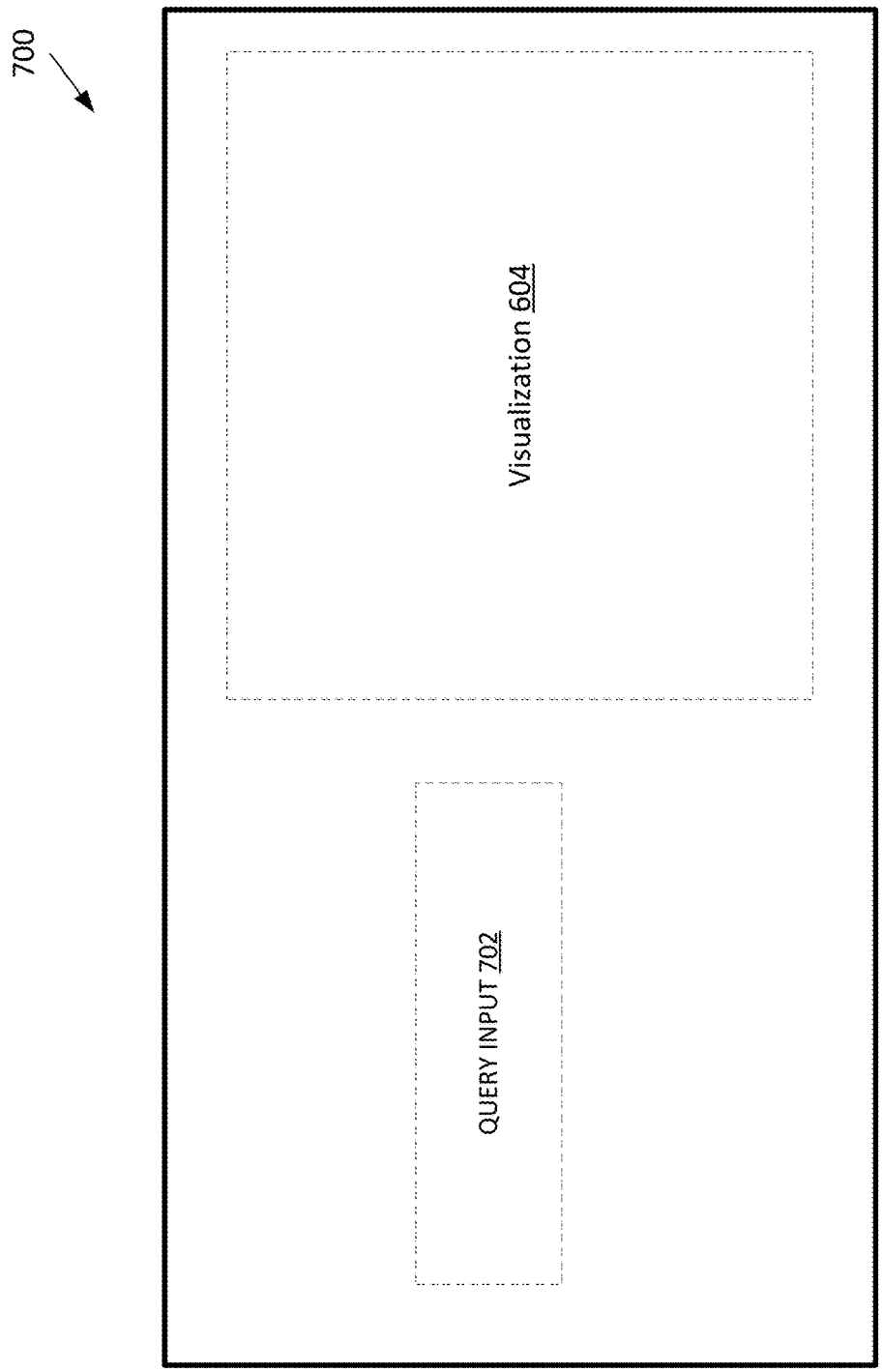
FIG. 7 illustrates an example user interface in accordance with some embodiments discussed herein.

FIG. 7 illustrates an example user interface 700 for providing visualizations, in accordance with one or more embodiments of the present disclosure. In one or more embodiments, the user interface 700 is, for example, an electronic interface (e.g., a graphical user interface) of the external computing entity 112. In various embodiments, the user interface 700 may be provided via external entity output device 220 (e.g., a display) of the external computing entity 112. The user interface 700 may be configured to render the visualization 604. In various embodiments, the visualization 604 may provide a visualization of the user result set 414. For example, the visualization 604 may render one or more visual elements related to the user result set 414. In some embodiments, the user interface 700 may be configured as a user interface for clinical decision automation (e.g., a clinical decision support user interface, a disease diagnosis support user interface, etc.) related to medical records for one or more patients. In some embodiment, the user interface 700 includes query input 702 configured to facilitate generation of the federated query 402. For example, a query request related to the federated query 402 and/or information associated therewith may be input via the query input 702.

In some examples, masked visual data provided via the visualization 604 includes, but is not limited to, masked clinical patient information of one or more patients, masked personally identifiable information of one or more patients, masked electronic health records of one or more patients, anonymized patient data of one or more patients, masked protected health information of one or more patients, patient data masked according to one or more privacy rules, scrambled patient data, redacted patient data, and/or other masked visual data.

Figure 8:
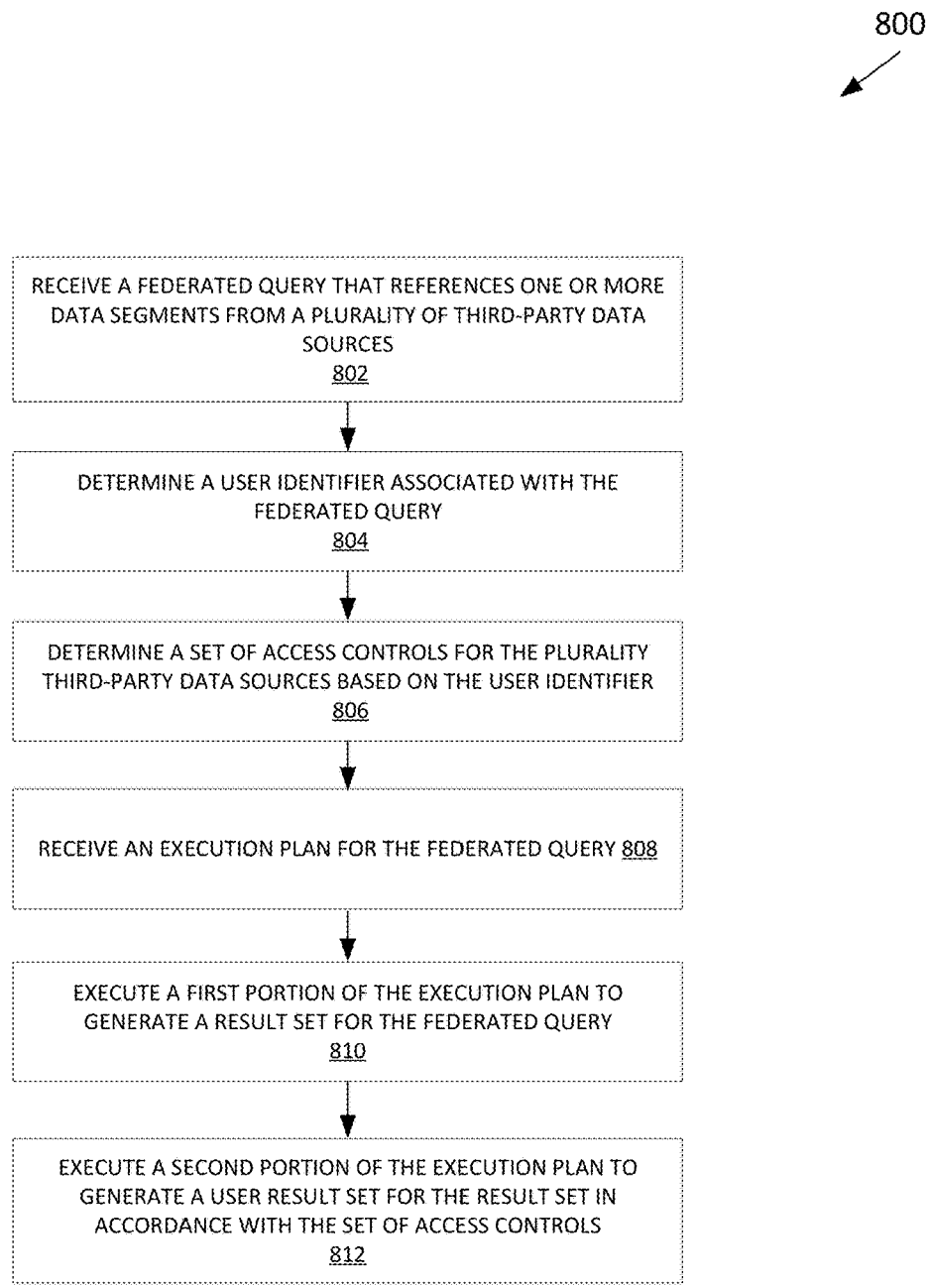
FIG. 8 is a flowchart showing an example of a process for providing access control for data provided by a federated query system based on attributes of a federated query in accordance with some embodiments discussed herein.

FIG. 8 is a flowchart showing an example of a process 800 for providing access control for data provided by a federated query system based on attributes of a federated query in accordance with some embodiments discussed herein. The flowchart depicts federated query processing techniques for dynamically controlling access to data segments and/or result sets generated by a federated query engine to overcome various limitations of traditional federated query engines. The federated query processing techniques may be implemented by one or more computing devices, entities, and/or systems described herein. For example, via the various steps/operations of the process 800, the computing system 100 may leverage the federated query processing techniques to overcome the various limitations with traditional federated query engines by improving security of data obtained from disparate data sources, minimizing computing resources for securely obtaining data from disparate data sources, and/or minimizing a number of queries with respect to disparate data sources.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes, at step/operation 802, receiving a federated query that references one or more data segments from a plurality of third-party data sources. For example, the computing system 100 may receive the federated query that references the one or more data segments from the plurality of third-party data sources. The computing system 100 may receive the federated query via a gateway (e.g., an API gateway) of a federated query system communicatively coupled to the plurality of third-party data sources. In addition, or alternatively, the federated query may be a data entity that represents a query to one or more of the plurality of third-party data sources. The federated query may also include a logical query statement that defines a plurality of query operations for accessing, receiving and/or processing data from one or more of the plurality of third-party data sources.

In some embodiments, the process 800 includes, at step/operation 804, determining a user identifier associated with the federated query. For example, the computing system 100 may determine the user identifier associated with the federated query. In some examples, the user identifier may identify a user or a user device associated with the federated query. In some embodiments, the user identifier is determined based on a header portion, a data segment portion, metadata, or another portion of the federated query. In some embodiments, the user identifier is determined based on user device information, network address information, and/or other information for a user device associated with the federated query.

In some embodiments, the process 800 includes, at step/operation 806, determining a set of access controls for the plurality third-party data sources based on the user identifier. For example, the computing system 100 may determine the set of access controls for the plurality third-party data sources based on the user identifier. The set of access controls may represent one or more rules for managing data permissions for the user identifier across the plurality of third-party data sources. For example, the set of access controls may facilitate authorization of the user identifier to access and/or view one or more portions of information aggregated from the plurality of third-party data sources in accordance with the federated query.

In some embodiments, the process 800 includes, at step/operation 808, receiving an execution plan for the federated query. For example, the computing system may receive the execution plan for the federated query. In some examples, the execution plan may include a plurality of executable tasks for generating a result set from a plurality of third-party data sources. In some examples, the execution plan is generated by a federated query engine according to an optimized execution strategy. In some examples, each of the plurality of executable tasks may include one or more query operations for performing a portion of the federated query. For example, each of the plurality of executable tasks may include one or more data accessing tasks, one or more data processing tasks, and/or one or masking tasks for performing a portion of the federated query.

In some embodiments, the process 800 includes, at step/operation 810, executing a first portion of the execution plan to generate a result set of the federated query. For example, the computing system 100 may execute the first portion of the execution plan to generate the result set of the federated query. In some examples, one or more data accessing tasks and/or one or more data processing tasks may be executed for resolving the federated query. In some examples, one or more machine learning tasks are executed to resolve the federated query. The result set may be a data entity that represents a result generated by resolving the federated query. The result set may include a dataset that includes information accessed, extracted, aggregated, processed, and/or analyzed from one or more of the plurality of third-party data sources in accordance with the federated query. For example, the result set may include the one or more data segments and/or a modified version of the one or more data segments, such as one or more columns, tables, and/or the like, from one or more of the third-party data sources. The data segments may be joined, aggregated, processed, and/or otherwise analyzed to generate the result set.

In some embodiments, the process 800 includes, at step/operation 812, executing a second portion of the execution plan to generate a user result set for the result set in accordance with the set of access controls. For example, the computing system may execute the second portion of the execution plan to generate the user result set for the result set in accordance with the set of access controls. In some examples, one or more masking tasks may be executed to resolve the federated query according to the set of access controls for the user identifier. In some examples, a mask is applied to one or more portions of the result set to generate the user result set. For instance, the user result set may mask one or more portions of information for the result set in accordance with the set of access controls. In some embodiments, the user result set may include a masked dataset that includes masked information for one or more portions of information accessed, extracted, aggregated, processed, and/or analyzed from one or more of the plurality of third-party data sources in accordance with the federated query. In some examples, the user result set may include one or more masked data segments and/or a masked version of the one or more data segments, such as one or more masked columns, tables, and/or the like, from one or more of the third-party data sources.

By enabling the determination of unique federated queries in accordance with access controls for a user identifier associated with the federated queries, the process 800 may improve the allocation of computing resources by reducing the execution of redundant federated queries. In this way, some embodiments of the present disclosure may be practically applied to provide a technical improvement to computers and, more specifically, to federated queries engines. Moreover, by enabling the determination of unique federated queries in accordance with access controls for a user identifier associated with the federated queries, the process 800 may improve security for third-party data sources. By enabling the determination of unique federated queries in accordance with access controls for a user identifier associated with the federated queries, the process 800 may also improve quality and/or security of data obtained from third-party data sources.

Some techniques of the present disclosure enable the generation of action outputs (e.g., query-based output actions, etc.) that may be performed to initiate one or more actions to achieve real-world effects. The data querying techniques of the present disclosure may be used, applied, and/or otherwise leveraged to generate masked data output, such as masked query responses, masked electronic communications, and/or masked visualizations. These outputs may be leveraged to initiate the performance of various computing tasks that improve the performance and/or security of a computing system (e.g., a computer itself, etc.) with respect to various actions performed by the computing system.

In some examples, the computing tasks may include actions that may be based on a prediction domain. A prediction domain may include any environment in which computing systems may be applied to achieve real-word insights, such as query access control predictions, and initiate the performance of computing tasks, such as actions, to act on the real-world insights. These actions may cause real-world changes, for example, by controlling a hardware component, providing targeted alerts, rendering masked visual data via an electronic interface, automatically allocating computing resources, optimizing data storage or data sources, and/or the like.

Examples of prediction domains may include financial systems, clinical systems, medical data systems, autonomous systems, robotic systems, and/or the like. Actions in such domains may include the initiation of automated instructions across and between devices, automated notifications, automated scheduling operations, automated precautionary actions, automated security actions, automated data processing actions, automated server load balancing actions, automated computing resource allocation actions, automated adjustments to computing and/or human resource management, and/or the like.

As one example, a prediction domain may include a clinical prediction domain. In such a case, the predictive actions may include automated physician notification actions, automated patient notification actions, automated appointment scheduling actions, automated prescription recommendation actions, automated drug prescription generation actions, automated implementation of precautionary actions, automated record updating actions, automated datastore updating actions, automated hospital preparation actions, automated workforce management operational management actions, automated server load balancing actions, automated resource allocation actions, automated call center preparation actions, automated hospital preparation actions, automated pricing actions, automated plan update actions, automated alert generation actions, and/or the like.

In some embodiments, the techniques of the process 800 are applied to initiate the performance of one or more actions. As described herein, the actions may depend on the prediction domain. In some examples, the computing system 100 may leverage the techniques of the process 800 to generate masked query responses, masked electronic communications, and/or masked visualizations. Accordingly, the computing system 100 may generate an action output with personalized access control of data and tailored to a federated query at a particular moment in time. The one or more actions may further include displaying masked visual renderings of data such as masked values, masked charts, and/or masked representations of data associated with third-party data sources and/or third-party data segments thereof.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method, the computer-implemented method comprising receiving, by one or more processors, a federated query from a user device that references one or more data segments from a plurality of third-party data sources; determining, by the one or more processors, a set of access controls for the plurality of third-party data sources based on the user identifier; generating, by the one or more processors, an execution plan for resolving the federated query via one or more executable tasks with respect to the plurality of third-party data sources; generating, by the one or more processors and using a first portion of the execution plan, a result set that comprises information aggregated from the plurality of third-party data sources in accordance with the federated query; and generating, by the one or more processors and using a second portion of the execution plan, a user result set that masks a portion of the information for the result set in accordance with the set of access controls.

Example 2. The computer-implemented method of any of the preceding examples, wherein receiving the federated query comprises receiving the federated query via an application programming interface (API) gateway of a federated query system communicatively coupled to the plurality of third-party data sources.

Example 3. The computer-implemented method of any of the preceding examples, further comprising providing a query response with the user result set to the user device to render masked visual data associated with the user result set via a user interface of the user device.

Example 4. The computer-implemented method of any of the preceding examples, further comprising configuring the masked visual data to overlay a visual mask over one or more values of the user result set.

Example 5. The computer-implemented method of any of the preceding examples, further comprising storing the result set in a cache memory; and based on an attribute set associated with the federated query, generating a first version of the user result set that masks a first portion of the information for the result set in accordance the set of access controls, or generating a second version of the user result set that masks a second portion of the information for the result set in accordance the set of access controls.

Example 6. The computer-implemented method of any of the preceding examples, further comprising determining data policy information associated with the one or more data segments; generating the set of access controls based on the data policy information and the user identifier; and generating the user result set in accordance with the set of access controls associated with the data policy information and the user identifier.

Example 7. The computer-implemented method of any of the preceding examples, further comprising receiving data source information from an orchestration engine associated with the plurality of third-party data sources; generating the set of access controls based on the data source information and the user identifier; and generating the user result set in accordance with the set of access controls associated with the data source information and the user identifier.

Example 8. The computer-implemented method of any of the preceding examples, further comprising determining data policy information associated with the one or more data segments; receiving data source information from an orchestration engine associated with the plurality of third-party data sources; generating the set of access controls based on the data policy information, the data source information, and the user identifier; and generating the user result set in accordance with the set of access controls associated with the data policy information, the data source information, and the user identifier.

Example 9. The computer-implemented method of any of the preceding examples, further comprising parsing the federated query into a syntax tree representing a sequence for the one or more executable tasks with respect to the plurality of third-party data sources; configuring the syntax tree based on the set of access controls; and generating the execution plan based on the syntax tree associated with the set of access controls.

Example 10. A system comprising memory and one or more processors communicatively coupled to the memory, the one or more processors configured to receive a federated query from a user device that references one or more data segments from a plurality of third-party data sources; determine a user identifier associated with the federated query; determine a set of access controls for the plurality of third-party data sources based on the user identifier; generate an execution plan for resolving the federated query via one or more executable tasks with respect to the plurality of third-party data sources; generate, using a first portion of the execution plan, a result set that comprises information aggregated from the plurality of third-party data sources in accordance with the federated query; and generate, using a second portion of the execution plan, a user result set that masks a portion of the information for the result set in accordance with the set of access controls.

Example 11. The system of any of the preceding examples, wherein the one or more processors are further configured to provide a query response with the user result set to the user device to render masked visual data associated with the user result set via a user interface of the user device.

Example 12. The system of any of the preceding examples, wherein the one or more processors are further configured to configure the masked visual data to overlay a visual mask over one or more values of the user result set.

Example 13. The system of any of the preceding examples, wherein the one or more processors are further configured to store the result set in a cache memory; and based on an attribute set associated with the federated query, generate a first version of the user result set that masks a first portion of the information for the result set in accordance the set of access controls, or generate a second version of the user result set that masks a second portion of the information for the result set in accordance the set of access controls.

Example 14. The system of any of the preceding examples, wherein the one or more processors are further configured to determine data policy information associated with the one or more data segments; generate the set of access controls based on the data policy information and the user identifier; and generate the user result set in accordance with the set of access controls associated with the data policy information and the user identifier.

Example 15. The system of any of the preceding examples, wherein the one or more processors are further configured to receive data source information from an orchestration engine associated with the plurality of third-party data sources; generate the set of access controls based on the data source information and the user identifier; and generate the user result set in accordance with the set of access controls associated with the data source information and the user identifier.

Example 16. The system of any of the preceding examples, wherein the one or more processors are further configured to determine data policy information associated with the one or more data segments; receive data source information from an orchestration engine associated with the plurality of third-party data sources; generate the set of access controls based on the data policy information, the data source information, and the user identifier; and generate the user result set in accordance with the set of access controls associated with the data policy information, the data source information, and the user identifier.

Example 17. The system of any of the preceding examples, wherein the one or more processors are further configured to parse the federated query into a syntax tree representing a sequence for the one or more executable tasks with respect to the plurality of third-party data sources; configure the syntax tree based on the set of access controls; and generate the execution plan based on the syntax tree associated with the set of access controls.

Example 18. One or more non-transitory computer-readable storage media including instructions that, when executed by one or more processors, cause the one or more processors to receive a federated query from a user device that references one or more data segments from a plurality of third-party data sources; determine a user identifier associated with the federated query; determine a set of access controls for the plurality of third-party data sources based on the user identifier; generate an execution plan for resolving the federated query via one or more executable tasks with respect to the plurality of third-party data sources; generate, using a first portion of the execution plan, a result set that comprises information aggregated from the plurality of third-party data sources in accordance with the federated query; and generate, using a second portion of the execution plan, a user result set that masks a portion of the information for the result set in accordance with the set of access controls.

Example 19. The one or more non-transitory computer-readable storage media of any of the preceding examples, wherein the instructions further cause the one or more processors to provide a query response with the user result set to the user device to render masked visual data associated with the user result set via a user interface of the user device.

Example 20. The one or more non-transitory computer-readable storage media of any of the preceding examples, wherein the instructions further cause the one or more processors to configure the masked visual data to overlay a visual mask over one or more values of the user result set.

The invention claimed is:
1. A computer-implemented method comprising:
receiving, by one or more processors, a federated query from a user device that references one or more data segments from a plurality of third-party data sources;
determining, by the one or more processors, a user identifier associated with the federated query;
determining, by the one or more processors, one or more access controls for the plurality of third-party data sources based on the user identifier;
generating, by the one or more processors, an execution plan for resolving the federated query via one or more executable tasks with respect to the plurality of third-party data sources;
generating, by the one or more processors and using a first portion of the execution plan, result data that comprises information aggregated from the plurality of third-party data sources in accordance with the federated query; and
generating, by the one or more processors and using a second portion of the execution plan, user result data that selectively provides a visual data obfuscation for a portion of the information for the result data in accordance with the one or more access controls for the plurality of third-party data sources.
2. The computer-implemented method of claim 1, wherein receiving the federated query comprises:

receiving the federated query via an application programming interface (API) gateway of a federated query system communicatively coupled to the plurality of third-party data sources.

3. The computer-implemented method of claim 1, further comprising:
providing a query response with the user result data to the user device to render masked visual data associated with the user result data via a user interface of the user device.

4. The computer-implemented method of claim 3, further comprising:
configuring the masked visual data to overlay a visual mask over one or more values of the user result data.

5. The computer-implemented method of claim 1, further comprising:
storing the result data in a cache memory; and
based on an attribute set associated with the federated query,
generating a first version of the user result data that masks a first portion of the information for the result data in accordance with the one or more access controls, or
generating a second version of the user result data that masks a second portion of the information for the result data in accordance with the one or more access controls.

6. The computer-implemented method of claim 1, further comprising:
determining data policy information associated with the one or more data segments;
generating the one or more access controls based on the data policy information and the user identifier; and
generating the user result data in accordance with the one or more access controls associated with the data policy information and the user identifier.

7. The computer-implemented method of claim 1, further comprising:
receiving data source information from an orchestration engine associated with the plurality of third-party data sources;
generating the one or more access controls based on the data source information and the user identifier; and
generating the user result data in accordance with the one or more access controls associated with the data source information and the user identifier.

8. The computer-implemented method of claim 1, further comprising:
determining data policy information associated with the one or more data segments;
receiving data source information from an orchestration engine associated with the plurality of third-party data sources;
generating the one or more access controls based on the data policy information, the data source information, and the user identifier; and
generating the user result data in accordance with the one or more access controls associated with the data policy information, the data source information, and the user identifier.

9. The computer-implemented method of claim 1, further comprising:
parsing the federated query into a syntax tree representing a sequence for the one or more executable tasks with respect to the plurality of third-party data sources;
configuring the syntax tree based on the one or more access controls; and
generating the execution plan based on the syntax tree associated with the one or more access controls.

10. A system comprising:
one or more processors; and
one or more memories storing processor-executable instructions that, when executed by the one or more processors, cause the one or more processors to perform operations comprising:
receiving a federated query from a user device that references one or more data segments from a plurality of third-party data sources;
determining a user identifier associated with the federated query;
determining one or more access controls for the plurality of third-party data sources based on the user identifier;
generating an execution plan for resolving the federated query via one or more executable tasks with respect to the plurality of third-party data sources;
generating, using a first portion of the execution plan, result data that comprises information aggregated from the plurality of third-party data sources in accordance with the federated query; and
generating, using a second portion of the execution plan, user result data that selectively provides a visual data obfuscation for a portion of the information for the result data in accordance with the one or more access controls for the plurality of third-party data sources.

11. The system of claim 10, wherein the processor-executable instructions, when executed by the one or more processors, further cause the one or more processors to perform operations comprising:
providing a query response with the user result data to the user device to render masked visual data associated with the user result data via a user interface of the user device.

12. The system of claim 11, wherein the processor-executable instructions, when executed by the one or more processors, further cause the one or more processors to perform operations comprising:
configuring the masked visual data to overlay a visual mask over one or more values of the user result data.

13. The system of claim 10, wherein the processor-executable instructions, when executed by the one or more processors, further cause the one or more processors to perform operations comprising:
storing the result data in a cache memory; and
based on an attribute set associated with the federated query,
generating a first version of the user result data that masks a first portion of the information for the result data in accordance with the one or more access controls, or
generating a second version of the user result data that masks a second portion of the information for the result data in accordance with the one or more access controls.

14. The system of claim 10, wherein the processor-executable instructions, when executed by the one or more processors, further cause the one or more processors to perform operations comprising:
determining data policy information associated with the one or more data segments;
generating the one or more access controls based on the data policy information and the user identifier; and
generating the user result data in accordance with the one or more access controls associated with the data policy information and the user identifier.

15. The system of claim 10, wherein the processor-executable instructions, when executed by the one or more processors, further cause the one or more processors to perform operations comprising:
- receiving data source information from an orchestration engine associated with the plurality of third-party data sources;
- generating the one or more access controls based on the data source information and the user identifier; and
- generating the user result data in accordance with the one or more access controls associated with the data source information and the user identifier.

16. The system of claim 10, wherein the processor-executable instructions, when executed by the one or more processors, further cause the one or more processors to perform operations comprising:
- determining data policy information associated with the one or more data segments;
- receiving data source information from an orchestration engine associated with the plurality of third-party data sources;
- generating the one or more access controls based on the data policy information, the data source information, and the user identifier; and
- generating the user result data in accordance with the one or more access controls associated with the data policy information, the data source information, and the user identifier.

17. The system of claim 10, wherein the processor-executable instructions, when executed by the one or more processors, further cause the one or more processors to perform operations comprising:
- parsing the federated query into a syntax tree representing a sequence for the one or more executable tasks with respect to the plurality of third-party data sources;
- configuring the syntax tree based on the one or more access controls; and
- generating the execution plan based on the syntax tree associated with the one or more access controls.

18. One or more non-transitory computer-readable storage media storing processor-executable instructions that, when executed by one or more processors, cause the one or more processors to perform operations comprising:
- receiving a federated query from a user device that references one or more data segments from a plurality of third-party data sources;
- determining a user identifier associated with the federated query;
- determining a one or more access controls for the plurality of third-party data sources based on the user identifier;
- generating an execution plan for resolving the federated query via one or more executable tasks with respect to the plurality of third-party data sources;
- generating, using a first portion of the execution plan, result data that comprises information aggregated from the plurality of third-party data sources in accordance with the federated query; and
- generating, using a second portion of the execution plan, user result data that selectively provides a visual data obfuscation for a portion of the information for the result data in accordance with the one or more access controls for the plurality of third-party data sources.

19. The one or more non-transitory computer-readable storage media of claim 18, wherein the processor-executable instructions, when executed by the one or more processors, further cause the one or more processors to perform operations comprising:
- providing a query response with the user result data to the user device to render masked visual data associated with the user result data via a user interface of the user device.

20. The one or more non-transitory computer-readable storage media of claim 19, wherein the processor-executable instructions, when executed by the one or more processors, further cause the one or more processors to perform operations comprising:
- configuring the masked visual data to overlay a visual mask over one or more values of the user result data.

* * * * *